(12) United States Patent
Kirwin et al.

(10) Patent No.: US 8,041,626 B2
(45) Date of Patent: *Oct. 18, 2011

(54) SYSTEMS AND METHODS FOR PROVIDING A TRADING INTERFACE

(75) Inventors: Glenn D. Kirwin, Scarsdale, NY (US);
Matthew Claus, Summit, NJ (US);
Joseph Noviello, New York, NY (US);
Andrew C. Gilbert, Califon, NJ (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/756,964

(22) Filed: Jun. 1, 2007

(65) Prior Publication Data

US 2007/0226127 A1    Sep. 27, 2007

Related U.S. Application Data

(63) Continuation of application No. 09/745,651, filed on Dec. 22, 2000.

(60) Provisional application No. 60/171,442, filed on Dec. 22, 1999.

(51) Int. Cl.
*G06Q 40/00* (2006.01)

(52) U.S. Cl. ......... 705/37; 705/35; 705/36 R; 705/36 T; 705/38; 705/39; 705/40; 705/41; 705/42; 345/156; 345/157; 715/212; 715/700

(58) Field of Classification Search ............... 705/35, 705/36 R, 36 T, 37, 38, 39, 40, 41, 42; 345/156, 345/157; 715/700, 212
See application file for complete search history.

(56) References Cited

U.S. PATENT DOCUMENTS

| | | | |
|---|---|---|---|
| 3,573,747 | A | 4/1971 | Adams et al. |
| 3,976,840 | A | 8/1976 | Cleveland et al. |
| 4,588,192 | A | 5/1986 | Laborde |
| 4,674,044 | A | 6/1987 | Kalmus et al. |
| 4,903,201 | A | 2/1990 | Wagner |
| 4,942,616 | A | 7/1990 | Linstroth et al. |
| 5,077,665 | A | 12/1991 | Silverman et al. |
| 5,101,353 | A | 3/1992 | Lupien et al. |
| 5,136,501 | A | 8/1992 | Silverman et al. |

(Continued)

FOREIGN PATENT DOCUMENTS

CA    2140164    1/1995

(Continued)

OTHER PUBLICATIONS

Office Action for U.S. Appl. No. 11/756,875, entitled "Systems and methods for providing a trading interface", mail date Aug. 23, 2007.

(Continued)

*Primary Examiner* — Olabode Akintola
*Assistant Examiner* — Muriel Tinkler
(74) *Attorney, Agent, or Firm* — Ruth J. Ma

(57) ABSTRACT

Systems and methods for configurable trading interfaces that allow a trader to quickly and easily submit trading commands to a trading system are provided. Using these systems and methods, a trader can using various trading interfaces to initiate trading commands, configure various display features and default command settings, and control a level of command entry verification that is provided to protect against inadvertent entry of incorrect trading commands.

56 Claims, 12 Drawing Sheets

U.S. PATENT DOCUMENTS

| | | | |
|---|---|---|---|
| 5,168,446 | A | 12/1992 | Wiseman |
| 5,189,238 | A | 2/1993 | Hayakawa |
| 5,243,515 | A | 9/1993 | Lee |
| 5,297,031 | A | 3/1994 | Gutterman et al. |
| 5,297,032 | A | 3/1994 | Trojan et al. |
| 5,375,055 | A | 12/1994 | Togher et al. |
| 5,394,324 | A | 2/1995 | Clearwater |
| 5,463,547 | A | 10/1995 | Markowitz et al. |
| 5,596,347 | A | 1/1997 | Robertson et al. |
| 5,640,569 | A | 6/1997 | Miller et al. |
| 5,682,206 | A | 10/1997 | Wehmeyer et al. |
| 5,689,652 | A | 11/1997 | Lupien et al. |
| 5,715,402 | A | 2/1998 | Popolo |
| 5,724,357 | A | 3/1998 | Derks |
| 5,724,524 | A | 3/1998 | Hunt et al. |
| 5,727,165 | A | 3/1998 | Ordish et al. |
| 5,787,402 | A | 7/1998 | Potter et al. |
| 5,805,167 | A | 9/1998 | Van Cruyningen |
| 5,809,483 | A | 9/1998 | Broka et al. |
| 5,815,657 | A | 9/1998 | Williams et al. |
| 5,845,266 | A | 12/1998 | Lupien et al. |
| 5,870,724 | A | 2/1999 | Lawlor et al. |
| 5,905,975 | A | 5/1999 | Ausubel |
| 5,924,082 | A | 7/1999 | Silverman et al. |
| 5,924,083 | A | 7/1999 | Silverman et al. |
| 5,950,177 | A | 9/1999 | Lupien et al. |
| 5,960,411 | A | 9/1999 | Hartman et al. |
| 5,963,924 | A | 10/1999 | Williams et al. |
| 5,973,619 | A | 10/1999 | Paredes |
| 6,012,046 | A | 1/2000 | Lupien et al. |
| 6,014,643 | A * | 1/2000 | Minton ................. 705/36 R |
| 6,016,484 | A | 1/2000 | Williams et al. |
| 6,064,981 | A | 5/2000 | Barni et al. |
| 6,068,552 | A | 5/2000 | Walker et al. |
| 6,098,051 | A | 8/2000 | Lupien et al. |
| 6,112,189 | A | 8/2000 | Rickard et al. |
| 6,115,698 | A * | 9/2000 | Tuck et al. ................. 705/37 |
| 6,131,087 | A | 10/2000 | Luke et al. |
| 6,134,535 | A | 10/2000 | Belzberg |
| 6,161,099 | A * | 12/2000 | Harrington et al. ......... 705/36 R |
| 6,181,340 | B1 | 1/2001 | Alimpich et al. |
| 6,195,647 | B1 | 2/2001 | Martyn et al. |
| 6,233,566 | B1 | 5/2001 | Levine et al. |
| 6,236,972 | B1 | 5/2001 | Shkedy |
| 6,247,000 | B1 | 6/2001 | Hawkins et al. |
| 6,260,024 | B1 | 7/2001 | Shkedy |
| 6,260,025 | B1 | 7/2001 | Silverman et al. |
| 6,272,474 | B1 | 8/2001 | Garcia |
| 6,278,982 | B1 | 8/2001 | Korhammer et al. |
| 6,343,278 | B1 | 1/2002 | Jain et al. |
| 6,408,282 | B1 | 6/2002 | Buist |
| 6,418,419 | B1 | 7/2002 | Nieboer et al. |
| 6,421,653 | B1 | 7/2002 | May |
| 6,473,744 | B1 | 10/2002 | Tuck et al. |
| 6,519,574 | B1 | 2/2003 | Wilton et al. |
| 6,766,304 | B2 | 7/2004 | Kemp, II et al. |
| 6,772,132 | B1 | 8/2004 | Kemp, II et al. |
| 6,809,741 | B1 * | 10/2004 | Bates et al. ................. 345/597 |
| 6,836,799 | B1 * | 12/2004 | Philyaw et al. ............... 709/224 |
| 6,904,602 | B1 | 6/2005 | Chow et al. |
| 6,938,011 | B1 | 8/2005 | Kemp, II et al. |
| 6,993,504 | B1 | 1/2006 | Friesen et al. |
| 7,006,991 | B2 | 2/2006 | Keiser et al. |
| 7,020,632 | B1 | 3/2006 | Kohls et al. |
| 7,080,033 | B2 | 7/2006 | Wilton et al. |
| 7,085,739 | B1 | 8/2006 | Winter et al. |
| 7,089,205 | B1 | 8/2006 | Abernethy |
| 7,113,190 | B2 | 9/2006 | Heaton |
| 7,127,424 | B2 | 10/2006 | Kemp, II et al. |
| 7,155,410 | B1 | 12/2006 | Woodmansey et al. |
| 7,171,386 | B1 * | 1/2007 | Raykhman .................. 705/37 |
| 7,184,970 | B1 | 2/2007 | Squillante |
| 7,212,999 | B2 * | 5/2007 | Friesen et ................... 705/37 |
| 7,225,150 | B2 | 5/2007 | Wilton et al. |
| 7,243,083 | B2 | 7/2007 | Burns et al. |
| 7,379,910 | B2 | 5/2008 | Abrahm et al. |
| 7,389,268 | B1 | 6/2008 | Kemp, II et al. |
| 7,415,436 | B1 | 8/2008 | Evelyn et al. |
| 7,505,915 | B2 | 3/2009 | Silverman et al. |
| 7,505,932 | B2 | 3/2009 | Kemp, II et al. |
| 7,542,943 | B2 | 6/2009 | Caplan et al. |
| 7,577,602 | B2 | 8/2009 | Singer |
| 7,599,856 | B2 | 10/2009 | Agrawal et al. |
| 7,689,489 | B2 | 3/2010 | Fergusson |
| 7,707,086 | B2 | 4/2010 | Burns et al. |
| 7,720,742 | B1 | 5/2010 | Mauro et al. |
| 7,725,383 | B2 | 5/2010 | Wilton et al. |
| 7,890,416 | B2 | 2/2011 | Kirwin et al. |
| 2002/0029180 | A1 | 3/2002 | Kirwin et al. |
| 2002/0091615 | A1 | 7/2002 | Salvani |
| 2002/0111907 | A1 | 8/2002 | Ling |
| 2002/0120546 | A1 | 8/2002 | Zajac |
| 2002/0120547 | A1 | 8/2002 | Zajac |
| 2003/0004862 | A1 | 1/2003 | Lutnick et al. |
| 2003/0018558 | A1 | 1/2003 | Heffner et al. |
| 2003/0023542 | A1 | 1/2003 | Kemp, II et al. |
| 2003/0041000 | A1 | 2/2003 | Zajac et al. |
| 2003/0061069 | A1 | 3/2003 | Silverman et al. |
| 2003/0088495 | A1 | 5/2003 | Gilbert et al. |
| 2003/0088499 | A1 | 5/2003 | Gilbert et al. |
| 2003/0088509 | A1 | 5/2003 | Wilton et al. |
| 2003/0097325 | A1 | 5/2003 | Friesen et al. |
| 2003/0120574 | A1 | 6/2003 | Wallman |
| 2003/0120575 | A1 | 6/2003 | Wallman |
| 2003/0154152 | A1 | 8/2003 | Gilbert et al. |
| 2006/0053074 | A1 | 3/2006 | Wilton et al. |
| 2006/0059082 | A1 | 3/2006 | Silverman et al. |
| 2007/0226126 | A1 | 9/2007 | Kirwin et al. |
| 2008/0033865 | A1 | 2/2008 | Wilton et al. |
| 2008/0071664 | A1 | 3/2008 | Silverman et al. |
| 2010/0325029 | A1 | 12/2010 | Kirwin et al. |
| 2010/0332372 | A1 | 12/2010 | Kirwin et al. |

FOREIGN PATENT DOCUMENTS

| | | |
|---|---|---|
| EP | 0399850 | 11/1990 |
| EP | 0491455 | 6/1992 |
| EP | 0512702 A2 | 11/1992 |
| EP | 665489 A2 * | 8/1995 |
| EP | 0625275 | 4/1997 |
| EP | 1100030 | 5/2001 |
| JP | 11-25158 | 1/1999 |
| WO | WO 93/15467 | 8/1993 |
| WO | WO 95/26005 | 9/1995 |
| WO | WO 98/49639 | 11/1998 |
| WO | WO 99/19821 | 4/1999 |
| WO | WO 99/26175 | 5/1999 |
| WO | WO 00/21013 | 4/2000 |
| WO | WO 00/58862 | 10/2000 |

OTHER PUBLICATIONS

"Two-sided Marker"—Investopedia.com (printed Nov. 14, 2005).

"Market maker" and "make a market"—www.morganstanleyindividual.com/customerservice/dictionary (printed Nov. 14, 2005).

USPTO Office Action for U.S. Appl. No. 09/745,651, Sep. 19, 2007 (18 pages).

USPTO Office Action for U.S. Appl. No. 09/745,651, Apr. 16, 2007 (18 pages).

USPTO Office Action for U.S. Appl. No. 09/745,651, Sep. 12, 2006 (9 pages).

USPTO Office Action for U.S. Appl. No. 09/745,651, Feb. 10, 2006 (10 pages).

U.S. Appl. No. 09/745,651, filed Dec. 22, 2000, Kirwin et al.

U.S. Appl. No. 11/756,875, filed Jun. 1, 2007, Kirwin et al.

U.S. Appl. No. 09/995,698, filed Nov. 29, 2001, Gilbert.

U.S. Appl. No. 09/982,709, filed Oct. 18, 2001, Gilbert et al.

USPTO Office Action for U.S. Appl. No. 09/745,651, Aug. 16, 2005 (9 pages).

USPTO Office Action for U.S. Appl. No. 09/745,651, Dec. 15, 2004 (9 pages).

USPTO Office Action for U.S. Appl. No. 09/745,651, Jan. 28, 2004 (8 pages).

USPTO Office Action for U.S. Appl. No. 11/756,875, Apr. 15, 2008 (15 pages).

USPTO Office Action for U.S. Appl. No. 11/756,964, Mar. 4, 2008 (15 pages).
USPTO Office Action for U.S. Appl. No. 11/756,964, Aug. 23, 2007 (12 pages).
USPTO Office Action for U.S. Appl. No. 09/995,698, Jan. 9, 2007 (7 pages).
USPTO Office Action for U.S. Appl. No. 09/995,698, Jun. 9, 2008 (8 pages).
USPTO Office Action for U.S. Appl. No. 09/982,709, May 21, 2007 (15 pages).
USPTO Office Action for U.S. Appl. No. 09/982,709, Apr. 27, 2007 (3 pages).
USPTO Office Action for U.S. Appl. No. 09/982,709, Feb. 23, 2007 (9 pages).
USPTO Office Action for U.S. Appl. No. 09/982,709, Jul. 28, 2006 (9 pages).
USPTO Office Action for U.S. Appl. No. 09/982,709, Nov. 30, 2005 (10 pages).
USPTO Office Action for U.S. Appl. No. 09/982,709, Apr. 1, 2005 (10 pages).
USPTO Office Action for U.S. Appl. No. 09/982,709, Jul. 28, 2004 (9 pages).
USPTO Office Action for U.S. Appl. No. 09/982,709, Jan. 20, 2004 (8 pages).
Caprini, et. al., "Data Acquisition General Control user Interface," Jun. 26, 1995, at http://citeseer.ist.psu.edu/617.html (printed Jul. 18, 2005).
MSDN, Microsoft Corporation, at http://msdn.microsoft.com/archive/default.asp?url=/archive/en-us/dnarvbtips/html/msdn_msdn72.asp (printed Feb. 11, 2004).
USPTO Office Action for U.S. Appl. No. 09/745,651, Oct. 31, 2008 (12 pages).
USPTO Office Action for U.S. Appl. No. 11/756,875, Oct. 28, 2008 (11 pages).
USPTO Office Action for U.S. Appl. No. 11/756,875, Jan. 26, 2009 (3 pages).
USPTO Office Action for U.S. Appl. No. 09/995,698, Apr. 1, 2009 (9 pages).
USPTO Office Action for U.S. Appl. No. 11/756,875, Jun. 10, 2009 (14 pages).
USPTO Office Action for U.S. Appl. No. 09/745,651, Aug. 18, 2009 (13 pages).
Canadian Office Action for Application No. 2395379, dated Jun. 23, 2004 (5 pages).
Canadian Office Action for Application No. 2395379, dated May 27, 2005 (6 pages).
Canadian Office Action for Application No. 2395379, dated Nov. 20, 2006 (6 pages).
Canadian Office Action for Application No. 2395379, dated Oct. 15, 2007 (6 pages).
Canadian Office Action for Application No. 2395379, dated Mar. 23, 2009 (6 pages).
U.S. Appl. No. 60/171,442, filed Dec. 22, 1999 (17 pages).
U.S. Appl. No. 60/251,790, filed Dec. 7, 2000 (6 pages).
Notification of Transmittal of the International Search Report or the Declaration for International Application No. PCT/US00/34958, dated Aug. 27, 2001 (5 pages).
International Preliminary Examination Report for International Application No. PCT/US00/34958, dated Apr. 16, 2002 (4 pages).
International Search Report for International Application No. PCT/US01/47464, dated Apr. 1, 2002 (3 pages).
Written Opinion for International Application No. PCT/US01/47464, dated Jan. 20, 2003 (4 pages).
International Preliminary Examination Report for International Application No. PCT/US01/47464, dated Apr. 23, 2003 (3 pages).
International Search Report for International Application No. PCT/US02/33302, dated Jul. 21, 2003 (3 pages).
Written Opinion for International Application No. PCT/US02/33302, dated Sep. 30, 2003 (4 pages).
International Preliminary Examination Report for International Application No. PCT/US02/33302, dated Aug. 13, 2004 (3 pages).
UK Examination Report for Application No. GB 0216279.0, dated Jul. 10, 2003 (2 pages).
UK Examination Report for Application No. GB 0216279.0, dated Feb. 11, 2004 (2 pages).
UK Examination Report for Application No. GB 0216279.0, dated May 24, 2004 (1 page).
USPTO Pre-Brief Appeal Conference Decision for U.S. Appl. No. 09/745,651, Dec. 31, 2009 (2 pages).
USPTO Examiner Interview Summary for U.S. Appl. No. 09/745,651, Mar. 15, 2010 (3 pages).
USPTO Examiner Interview Summary for U.S. Appl. No. 11/756,875, Mar. 16, 2010 (3 pages).
BPAI Order Returning Undocketed Appeal to the Examiner for U.S. Appl. No. 09/982,709, Jun. 9, 2009 (3 pages).
USPTO Advisory Action for U.S. Appl. No. 09/982,709, Jul. 20, 2009 (3 pages).
BPAI Administrative Remand to Examiner for U.S. Appl. No. 09/982,709, Apr. 21, 2010 (3 pages).
Canadian Examiner's Report for Application No. 2395379, dated Apr. 29, 2010 (8 pages).
USPTO Petition Decision for U.S. Appl. No. 09/745,651, Sep. 1, 2010 (1 page).
USPTO Petition Decision for U.S. Appl. No. 11/756,875, Aug. 31, 2010 (1 page).
USPTO Notice of Withdrawal from Issue for U.S. Appl. No. 11/756,875, Sep. 1, 2010 (1 page).
Notice of Opposition filed on Jan. 15, 1998 against European Application No. EP 93904823.7 with Annex A3, document dated Jan. 16, 1998 (108 pages).
"Money Match Functional Specification," The Sequor Group, Inc. Software Services, Version 1, Aug. 1990 (87 pages).
USPTO Notice of Allowance and Fees Due for U.S. Appl. No. 11/756,875, Aug. 2, 2010 (3 pages).
Trading Technologies document, "Trading System Confidential User Documentation," p. 32, allegedly 1998 (one page).
USPTO Notice of Allowance and Fees Due for U.S. Appl. No. 09/745,651, Aug. 4, 2010 (3 pages).
U.S. Appl. No. 12/789,006, filed May 27, 2010, Inventors: Glenn D. Kirwin, et al., entitled "Systems and Methods for Providing a Trading Interface" (48 pages).
U.S. Appl. No. 12/789,122, filed May 27, 2010, Inventors: Glenn D. Kirwin, et al., entitled "Systems and Methods for Providing a Trading Interface" (48 pages).
USPTO Notice of Allowance and Fees Due and Examiner Interview Summary for U.S. Appl. No. 09/745,651, Jun. 9, 2010 (19 pages).
USPTO Notice of Allowance and Fees Due and Examiner Interview Summary for U.S. Appl. No. 11/756,875, Jun. 22, 2010 (9 pages).
Hsu, Y. et al. An Approach for Designing Composite Metaphors for User Interfaces. Behavior & Information Technology. vol. 26, No. 3. May-Jun. 2007. pp. 209-220.
Jayapandian, Magesh. Automated Creation of Database Forms. Proquest Dissertations and Theses 2009. Section 0127, Part 0984. [Ph. D. dissertation]. United States—Michigan: University of Michigan. 2009. Publication No. AAT 3354270.
MacNaughton, David et al. Design and Optimization Aids for Composite Control Charts. Quality Engineering © Taylor & Francis Group, LLC. 2009.
U.S. Appl. No. 12/789,006, filed May 27, 2010, Kirwin, et al.
U.S. Appl. No. 12/789,122, filed May 27, 2010, Kirwin, et al.
USPTO Office Action for U.S. Appl. No. 09/982,709, Jul. 8, 2010 (7 pages).
USPTO Examiner Interview Summary for U.S. Appl. No. 09/995,698, Jun. 24, 2010 (4 pages).
USPTO Notice of Allowance and Fees Due for U.S. Appl. No. 09/745,651, Sep. 30, 2010 (6 pages).
USPTO Notice of Allowance and Fees Due for U.S. Appl. No. 11/756,875, Sep. 29, 2010 (6 pages).
USPTO Office Action for U.S. Appl. No. 12/789,006, Sep. 30, 2010 (12 pages).
USPTO Supplemental Notice of Allowance and Fees Due for U.S. Appl. No. 09/745,651, Oct. 26, 2010 (3 pages).
USPTO Notice of Allowability for U.S. Appl. No. 09/745,651, Nov. 9, 2010 (4 pages).
USPTO Notice of Allowability for U.S. Appl. No. 11/756,875, Nov. 9, 2010 (4 pages).

USPTO Office Action for U.S. Appl. No. 12/789,122, Nov. 26, 2010 (12 pages).
USPTO Notice of Allowance and Fees Due for U.S. Appl. No. 09/995,698, Jan. 10, 2011 (4 pages).
USPTO Office Action for U.S. Appl. No. 09/982,709, Apr. 1, 2011 (14 pages).
USPTO Examiner Interview Summary for U.S. Appl. No. 09/995,698, Sep. 11, 2009 (4 pages).
USPTO Office Action for U.S. Appl. No. 09/995,698, Dec. 24, 2009 (10 pages).
USPTO Examiner Interview Summary for U.S. Appl. No. 09/982,709, Jan. 23, 2006 (3 pages).
USPTO Examiner Interview Summary for U.S. Appl. No. 09/745,651, Aug. 16, 2005 (2 pages).
USPTO Examiner Interview Summary for U.S. Appl. No. 09/745,651, Nov. 1, 2007 (3 pages).
USPTO Examiner Interview Summary for U.S. Appl. No. 11/756,875, Jul. 10, 2008 (2 pages).
USPTO Examiner Interview Summary for U.S. Appl. No. 11/756,875, Nov. 2, 2009 (3 pages).
USPTO Examiner's Answer to Appeal Brief for U.S. Appl. No. 09/982,709, Aug. 19, 2008 (17 pages).
USPTO Examiner's Answer to Appeal Brief for U.S. Appl. No. 09/982,709, Nov. 18, 2008 (17 pages).
USPTO Examiner's Answer to Appeal Brief for U.S. Appl. No. 09/982,709, Feb. 24, 2009 (17 pages).
UK Examination Report for Application No. GB 0313935.9, dated Apr. 5, 2004 (3 pages).
Canadian Office Action for Application No. 2469510, dated Aug. 11, 2009 (4 pages).

* cited by examiner

SYSTEMS AND METHODS FOR PROVIDING A TRADING INTERFACE

CROSS REFERENCE TO RELATED APPLICATION

The present application is a continuation of U.S. patent application Ser. No. 09/745,651, filed Dec. 22, 2000, entitled "Systems and Methods for Providing a Trading Interface"; which claims the benefit of U.S. Provisional Patent Application Ser. No. 60/171,442, filed Dec. 22, 1999, each of which is hereby incorporated by reference herein in its entirety.

BACKGROUND OF THE INVENTION

This invention relates to systems and methods for providing a trading interface. More particularly, this invention provides a trading interface that allows a trader to use a pointing device such as a mouse to execute a trade quickly and accurately.

As electronic trading becomes more popular, an increasing number of traders are in need of new systems and methods to enter trade commands in a quick, efficient, and accurate manner. In one method of electronic trading, bids and offers are submitted by traders to a trading system, those bids and offers are then displayed by the trading system to other traders, and the other traders may then respond to the bids and offers by submitting sell (or hit) or buy (or lift or take) commands to the system.

Many implementations of this method of electronic trading, while generally accurate, lack in desired speed mainly because traders are forced to use both a standard PC keyboard and a mouse to execute a trade. This dual process causes much delay for traders because the traders must follow several steps prior to accomplishing a trade. For example, many traders using typical trading systems are required to (1) click on an issue of choice, (2) click on a buy or sell button, and (3) use the keyboard to enter a price and size for the trade.

The benefit of using a keyboard to execute a trade is that a trader may execute a trade with a great deal more speed than with a mouse. Specifically, with a keyboard, the trader may use all ten fingers, while with a mouse the trader may use two fingers at most.

Despite the drawbacks associated with using a mouse, many traders continue to use a mouse because it is considered easy to use, and thus traders feel that they are less likely to make unwarranted trading mistakes with a mouse. Because trading professionals frequently have large amounts of money at stake when trading, many professionals prefer to forgo speed and efficiency for peace of mind.

While mouse-based interfaces have existed for years, these interfaces have put traders using them at a disadvantage when competing with full-time keyboard traders. One reason the existing mouse-based interfaces place those traders at a disadvantage is that those traders are forced to physically move a mouse pointer from an indicator for a desired instrument, that is at some given point on a trading screen, to some other point on the screen where bidding/offering and buying/selling commands can be entered. This approach is very time consuming.

Thus, it is an object of the invention to provide systems and methods that enable a trader to execute trades quickly, efficiently, and accurately using a pointing device interface.

SUMMARY OF THE INVENTION

In accordance with this and other objects of the invention, systems and methods provide configurable trading interfaces that allow a trader to quickly and easily submit trading commands to a trading system. More particularly, in accordance with this invention, the trader can use various trading interfaces to initiate trading commands, configure various display features and default command settings, and control a level of command entry verification that is provided to protect against inadvertent entry of incorrect trading commands.

In order to initiate a trading command using the present invention, a trader may enter the command using a command-line interface, click on a component of a bid and offer in a market cell, enter the command using a graphical interface, or may click on a piece of data in a data window. After initiating a command from a command-line interface, a market cell, or a data window, the present invention may verify the entry by presenting a graphical interface. This interface may be the same graphical interface that may be used to enter a trading command. In addition to displaying the graphical interface, a mouse pointer may be redirected to a portion of the graphical interface to speed up entry of the trading command. After initiating the command, but before completing the command, a trader may then alter the parameters of the command either to complete entry of the parameters or to correct one or more incorrect entries.

To enable customization of the graphical interface to a trader's preferences, settings controls are provided. These controls may enable the trader to set a preferred order type, cause the graphical interface to automatically close after a trade command has been entered or canceled, display a history of trade commands, set the trade item type, set how bid and offer information is displayed, set how default prices, sizes, and limits, and set position and color preferences.

As will be apparent upon reading the Detailed Description of the Preferred Embodiments, various features of the present invention may be implemented with any type of trading system for the trading of any type of item. For example, as illustrated herein, the invention may be used with a bid/offer, buy/sell trading system for trading of financial instruments, such a bonds. Likewise, as another example, the invention may be used with a matching system, wherein bids and offers are submitted by various traders and matched, for the trading of other items, such a materials and supplies for manufacturing.

BRIEF DESCRIPTION OF THE INVENTION

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
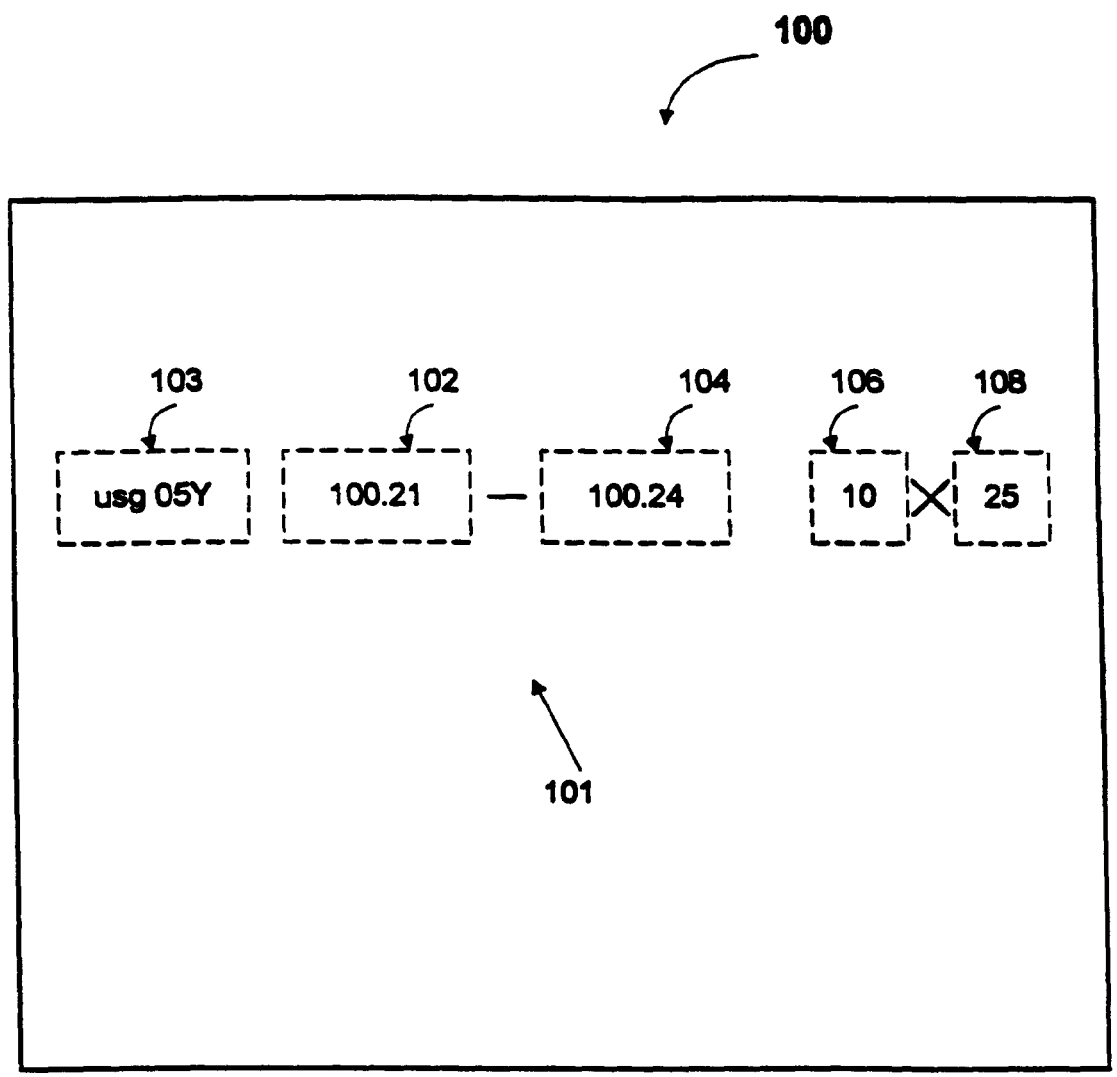
FIG. 1 is an illustration of a market cell that may be generated in accordance with certain embodiments of the present invention.

Turning to FIGS. 1-4, examples of screen displays that may be presented in certain embodiments of the present invention are illustrated. FIG. 1 shows a market cell 100 that may be used to display one or more bid and/or one or more offer 101 for an item to be traded. As illustrated, bid and offer 101 indicates a price 102 which a buyer is willing to pay for a selected item 103 at a given size 106 (i.e., a number of the item) and a price 104 which a seller is willing to accept for selected item 103 at a given size 108.

Each component of a market shown in market cell 100 may be marked with a color, or in any other suitable manner, to indicate features of that component. For example, as shown in FIG. 1, the entire area of fields 102, 103, 104, 106, and 108 may be colored, or only the symbols in those fields may be colored, to assign a meaning to each field. As a further example, a specific color may be assigned to field 102 to indicate that a price in the field is a bid price. Preferably, a trader is able to specify the color assigned to each component of a trade. The fields, or symbols contained therein, may be continuously colored or may be shown in a chosen color when a mouse pointer is passed over each field or used to click on each field.

In order to bid for, offer to sell, buy, and/or sell an item through market cell 100, a trader may submit a trading command indicating the action to be taken using various approaches. For example, in preferred embodiments, a trader may submit the trading command using a command-line interface, by clicking on components of bid and offer 101, and/or using a graphical interface.

When using a command-line interface, a trading command may be entered in any non-graphical interface desired. For example, a trader may submit a trading command by pressing buttons on a keyboard. Likewise, a trader could use a voice recognition system to enter commands verbally, or a trader could use some combination of voice recognition, keyboard, and pointing device.

A trader may also indicate a desire to bid, offer, buy, and/or sell an item by clicking on different portions of a bid and offer 101 for that item in market cell 100. For example, if the trader clicks on bid price 102, the trader may indicate to submit a bid for the item. If the trader clicks on offer price 104, the trader may indicate to submit an offer for the item. If the trader clicks on bid size 106, the trader may submit a command to sell the item. And, if the trader clicks on offer size 108, the trader may submit a command to buy the item.

Preferred embodiments of the present invention may allow a trader to use different levels of mouse button entries to initiate a trading command. That is, for flexibility, this invention may allow a trader to determine how many clicks on components of bid or offer 101 using a button of a mouse are required before the trader either bids for, offers to sell, buys, and/or sells an item corresponding to the market cell. For example, for maximum speed and slightly more risk, the trader may choose that a market be acted upon after a single click on a component of bid or offer 101. Likewise, a trader may choose to use a double click on a market before it is acted upon.

Figure 2:
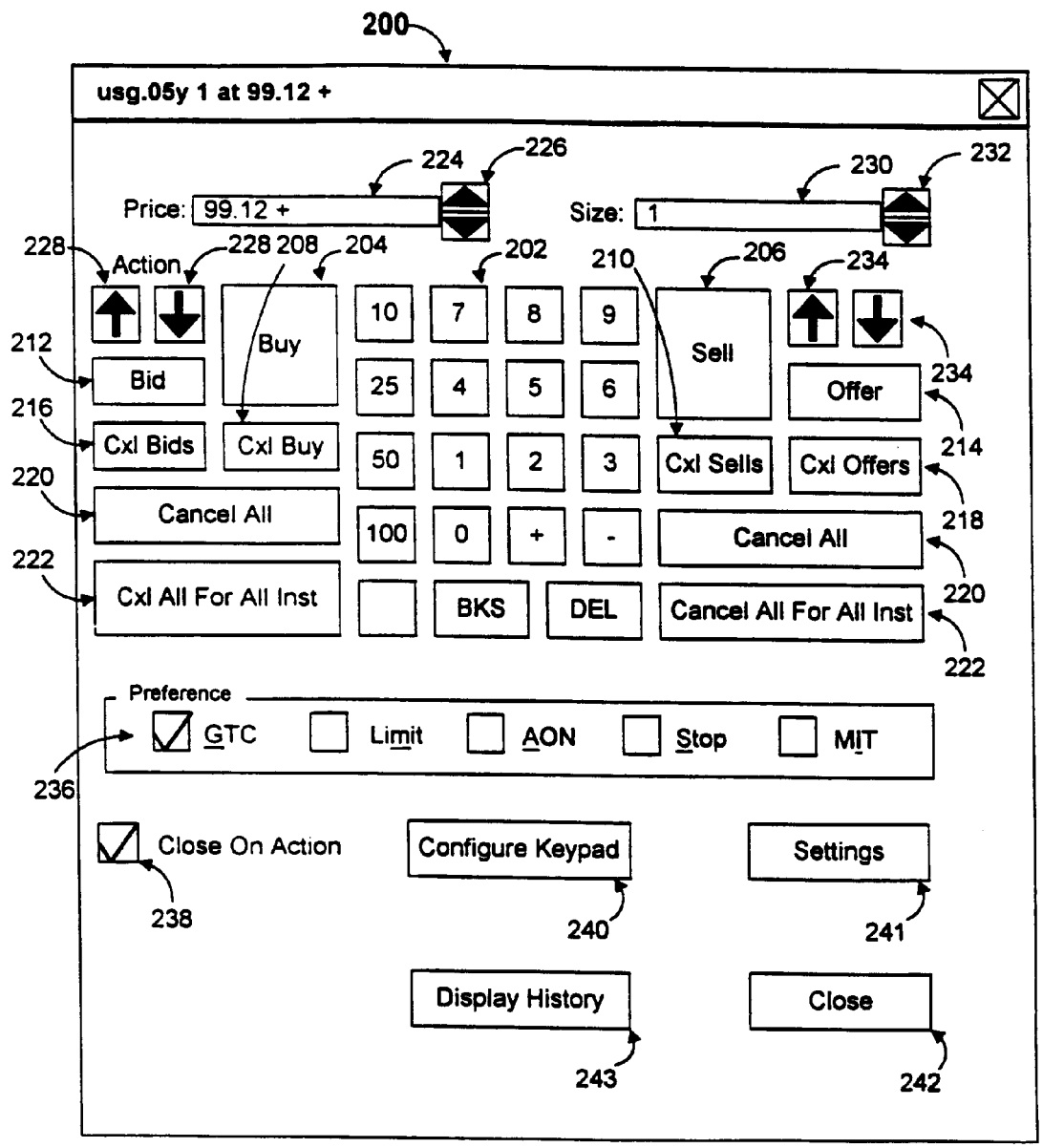
FIG. 2 is an illustration of a dialog window that may be generated in accordance with certain embodiments of the present invention.

FIG. 2 illustrates one embodiment of a graphical interface for submitting trading commands. As shown, the graphical interface comprises a dialog window 200 with various buttons and entry fields 202-242. Using these buttons and entry fields, a trader may submit a bid command, an offer command, a buy command, or a sell command for an item corresponding to a market cell 100. Preferably, each traded item uses a unique dialog window 200. Dialog window 200 may be opened automatically and/or manually before, during, and/or after a trade, and may allow a trader to submit a trade command at any time. The dialog window may be repositioned on a trader's display and/or fixed in place. The trader, preferably, will keep the window associated with a particular instrument below the market cell 100 for the same tradable item. The number of dialog windows 200 that can be kept open at any one time is preferably unlimited.

As shown in FIG. 2, dialog window 200 may comprise a variety of on-screen buttons and entry fields. Generally, a button, as displayed in box 200, may be "pushed" by placing a pointing device's pointer over the button and pressing a switch on the pointing device, as is commonly known in the art. At the center of window 200, a numeric keypad 202 may be displayed. The numeric keypad 202 may provide buttons for numbers zero through nine, and may contain buttons for numbers ten, twenty-five, fifty, and one hundred or any other suitable or desirable values. The numeric keypad 202 may also contain a plus button ("+"), a minus button ("−"), a decimal point button ("."), a backspace button ("BKS"), and a delete button ("DEL").

In addition to displaying a numeric keypad as described above, dialog window 200 may also provide a user with a buy button 204, a sell button 206, a cancel buys button 208, a cancel sells button 210, a bid button 212, an offer button 214, a cancel bids button 216, a cancel offers button 218, cancel all buttons 220, cancel all for all instruments button 222, a price entry field 224, price up and down buttons 226, bid price up and down buttons 228, offer price up and down buttons 234, a size entry field 230, and size up and down buttons 232. Finally, dialog window 200 may contain a preference field 236 that allows a user to specify preferred types of orders, a close-on-action box 238 that causes dialog window 200 to be automatically closed after specified actions are performed, a configure keypad button 240 that allows a user to arrange the keypad for dialog window 200, a close button 242 that closes the dialog window 200 on demand, a settings button 241, and a display history button 243 that causes a history list of order entries to be display when pressed.

Preference field 236 may be used to indicate the user's preferred trade type and may allow the user to select any type of trade that a particular exchange or trading system supports. Although FIG. 2 provides specific examples of trade types (e.g., good-till-canceled (GTC), limit, all-or-none (AON), stop, and market-if-touched (MIT)), the invention may be implemented with any type of trade.

Configure keypad button 240 may allow a trader to arrange buttons appearing in dialog window 200 to be anywhere a trader prefers by first pressing the configure keypad button 240, by then dragging the buttons to new positions, and finally by clicking on button 240 again. Also, the configuration or re-configuration of buttons can change the function of those buttons depending on the type of trading desired or what type of item is being traded.

Although any of the approaches described herein to submitting a trading command may be used independently of the others, two or more approaches may also be used in conjunction. For example, when using a command-line interface, an entry verification feature of the present invention may display a graphical interface to confirm a trader's intentions after a command-line trade command has been entered. Similarly, as another example, after clicking on a component of a bid and offer 101 in a market cell 100, an entry verification feature of the present invention may display a graphical interface to a trader to allow the trader to alter and/or confirm the command being submitted.

To speed entry of a trading command when using various approaches to submit a trading command in conjunction, the present invention preferably includes a pointer warping feature that redirects the focus of the pointing device pointer to another location of the trader's display. In accordance with this feature, for example, when a trader clicks on a bid price 102 ($100.21 as depicted in FIG. 1) in a market cell 100, a dialog window 100 may pop-up (if not already open), and a pointer that is being used by the trader may be immediately redirected to a bid button 212 to save the trader the time of repositioning the pointer to that location. Once in the new location, the trader may then use the pointer to confirm and/or modify the trade command and then submit the trade command using bid button 212. Although this feature of the present invention is described in connection with a pointing device pointer, this feature may be implemented using any suitable graphical interface pointer, cursor, or similar object.

Assume instead that, in the previous example, the trader wants to increase bid price 102 to $100.22. When the appropriate trade submission approaches are used in conjunction, the trader may click anywhere on the displayed bid and offer 101, and thereby cause dialog window 200 to appear. At this point, the trader may press bid button 212 once and thereby cause bid price 102 ($100.21 as illustrated in FIG. 1) to appear in price entry field 224. To increase bid price 102 from $100.21 to $100.22, the trader may then press price up button 226, or press bid price up button 228. When dealing with an offer, the trader may press offer price up button 226 or press price up button 234. Because time is typically of the essence, the trader will preferably use bid price up button 228 or offer price up button 234 because it is closer to bid button 212. Finally, to submit the bid, the trader may click on bid button 212 again to submit the bid. Alternatively, if the trader didn't want to alter the price, the trader could have double clicked immediately on bid button 212.

After any trade command is entered by pressing bid button 212, offer button 214, buy button 204, or sell button 206, the mouse pointer may then be maintained in its position above the just-pushed button in case the trader wants to repeat entry of the same trade command shortly thereafter.

As indicated above, a trader may never need to type a full price in field 102. Instead, a trader may configure the dialog window to automatically post in price entry field 224 either the current bid or offer price or a pre-programmed-increment-better bid or offer price of a bid or offer that the trader clicks on. Alternatively, a trader may point to each individual number or quantity (i.e., 0-9, 10, 25, 50, or 100) in keypad 202 and, in effect, input the desired price (or size) using a mouse.

In order to enter a size for a bid, offer, buy, or sell command, a trader may either choose to use a pre-programmed default size or adjust the size of a trade in size entry field 230.

When the trader is either bidding or offering, size entry field 230 preferably will initially always show a pre-set size amount as configured by the trader. To increase or decrease the size, the trader may either push the size up or size down buttons 232, or delete the size and enter a new size using the keypad 202.

Preferably, by default, size entry field 230 is filled with a selected bid or offer's size and highlighted when dialog window 200 is opened in response to a trader clicking on the selected bid or offer size. By highlighting the size entry field 230, a trader may change the size by simply pushing any of the buttons on keypad 202 without first highlighting and/or deleting numbers in that field. Once a desired size is entered, a trader may then push sell button 206 or buy button 204 and submit an order to sell or buy the size appearing in size entry field 224.

Another way for a trader to bid is to choose an instrument and a size and then press bid button 212 without designating a price. By entering a bid in this manner, the trader simply joins the best bid that appears on the trader's screen for that instrument. Although this approach to entering a bid is extremely easy and fast, a trader is risking that in the moment just prior to pressing bid button 212, the bid price appearing on the screen may change and thus force a trader to use the new price. Should this occur, a trader may press the cancel bids button 216 and re-enter a desired bid using the method described above.

As mentioned above, an entry verification feature of the present invention may be used in conjunction with a command-line interface or a click on bid or offer interface to cause a graphical interface to be presented after a trader submits a command-line trade command or a clicks on a component of a bid or offer. For example, if using a command-line interface, a trader submits a command to bid at a certain price for a certain size, a dialog window 200 may automatically appear (if not already shown), price and size fields 224 and 230 may be populated with the certain price and the certain size, and the pointer may be warped to just above bid button 212. The trader can then press bid button 212 to confirm the command or alter the price and/or size as described above.

Although the illustrations above are discussed in connection with bidding for and buying of an item, it should be obvious to those of ordinary skill in the art that the same features of the present invention are available in the offering for and selling of an item. Offer and sell buttons may be used instead of bid and buy buttons to offer and sell, respectively, an item.

Figure 3:
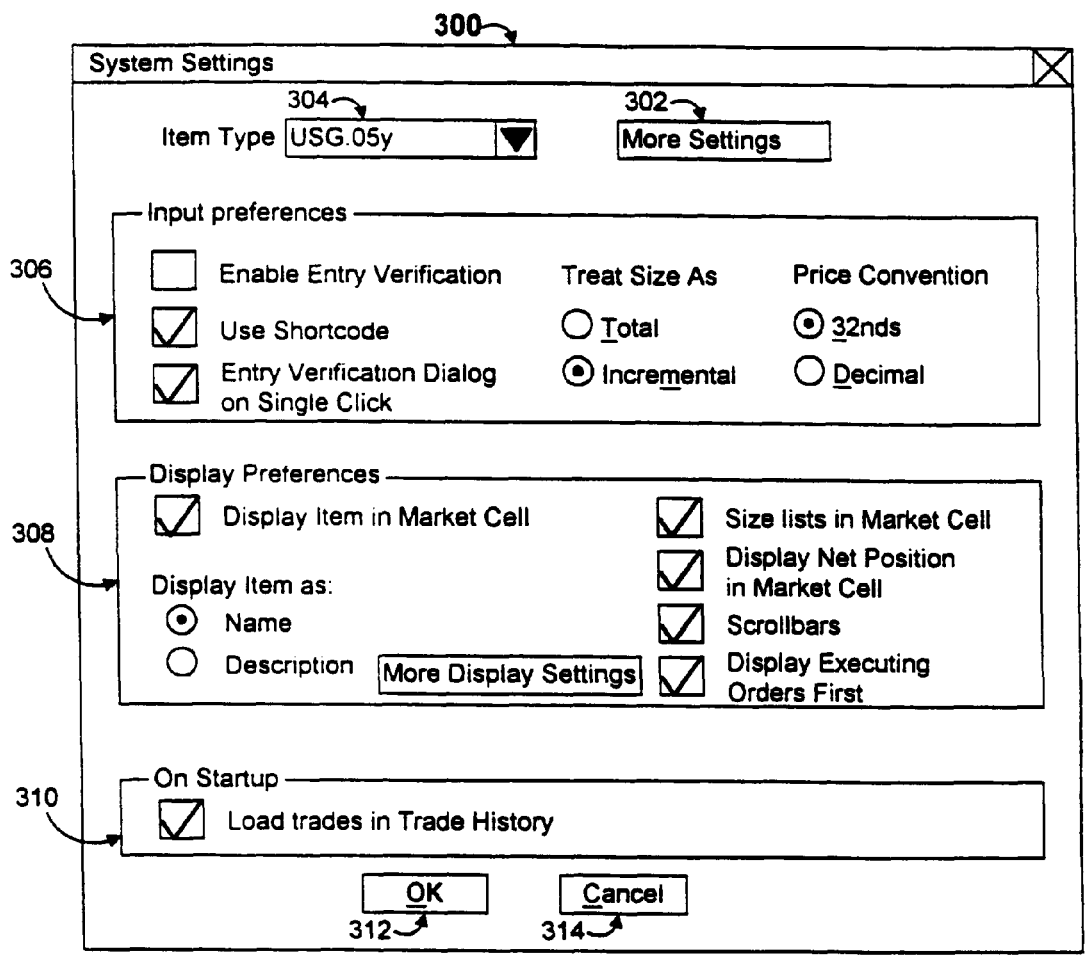
FIGS. 3 and 4 are illustrations of system settings windows that may be generated in accordance with certain embodiments of the present invention.

FIG. 3 shows a system settings screen 300 that may be presented upon a trader pressing "settings" button 241 in dialog window 200 or a corresponding function key. In order for preferred embodiments of the present invention to operate ideally for a trader, the trader may have to configure at least one setting in systems settings screen 300. Systems setting screen 300 may comprise a "more settings" button 302, an item type selection field 304, input preference settings 306, display preference settings 308, an on-startup preference setting 310, an "OK" button 312, and a "Cancel" button 314.

Within the item type selection field 304, a trader may select a preferred item type by indicating a type of item to be traded. For example, as illustrated in FIG. 3, item type selection field 304 indicates that the item to be traded is a 5 year U.S. Treasury bond. Other available item types, including financial instruments, bets or wagering instruments, or other tradable items, however, may be displayed and selected using a drop-down list associated with item type selection field 304.

Input preference settings 306 may allow a trader to enable or disable the entry verification feature, use short codes to facilitate futures contracts transactions (when futures contracts are a tradable item), open dialog window 200 when a single click is entered on a bid or offer, select whether an entered size is treated as a total size or an incremental size, and select whether a price is displayed in 32nds format or decimal format.

Display preference settings 308 may enable a trader to specify how bids and offers are displayed. More particularly, preference settings 308 may allow a trader to indicate whether to display a current instrument in a market cell 100, whether to display the current instrument by name or description, whether to list sizes for various bids and offers in the market cell, whether to display the net position in the market cell, whether to display scroll bars for the market cell, whether to display executing orders for the instrument first in the market cell, and whether to allow the trader to configure other display preferences by pressing "more display settings" buttons. An on-startup preference setting 310 may enable a trader to indicate whether trades from a previous trading session are loaded into the trade history upon start-up of dialog window 200. Finally, an "OK" button 312 and a "Cancel" button 314 may be provided to enable a trader to indicate whether to accept recently inputted changes or cancel the changes, respectively.

Figure 4:
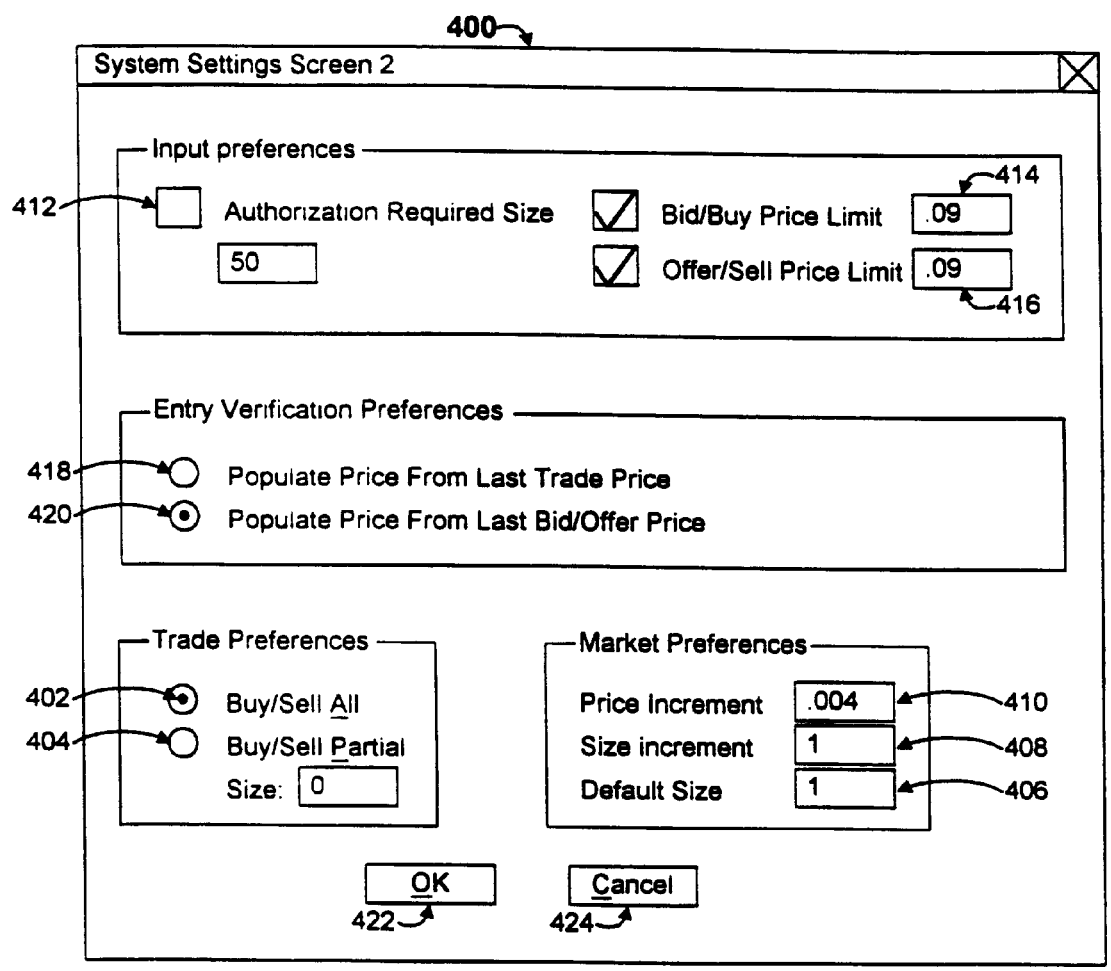

If, from systems settings screen 300, a trader presses "more settings" button 302, a second settings screen 400 may be displayed as shown in FIG. 4. As can be seen, second settings screen 400 may provide the trader with an ability to specify, using trade preferences, whether to buy or sell all 402 of the size of an offer or bid as displayed, or, regardless of the displayed size, to buy or sell a certain pre-designated size (Buy/Sell Partial Size 404) when clicking on a security in a market cell. Likewise, second settings screen 400 also permits the trader to specify a default size 406 for bids and offers, a default size increment 408 for bids and offers that will be used for size up/down button depressions, and a default price increment 410 for bids and offers that will be used for price up/down button depressions.

Second settings screen 400 also allows the trader to specify limits to prevent accidental entry of a command for a price or size that is outside a reasonably expected range. By selecting box 412, the trader may enable a confirmation alert that prompts the trader for authorization to submit a command for a size larger than the limit (previously selected by the trader or set by the system based on the trader's previous trading history and the traded item's overall market history). By selecting and setting a bid/buy price limit 414 and an offer/sell price limit 416, the trader may also specify a maximum bid/buy price and a minimum offer/sell price.

Finally, as shown in second settings screen 400, the trader may select whether to automatically populate a bid/offer with a last trade price or a last bid/offer price using entry verification preferences 418 and 420.

Once a trader has completed setting the preferences, a trader may submit the preferences by pressing an "OK" button 422 or cancel the preferences by pressing a "Cancel" button 424.

If a trader presses the "more display settings" button in display preferences 308 of settings screen 300 of FIG. 3, display settings screen 500 may appear to allow the trader to specify screen colors, window positioning, and other display functions. By selecting "ON" button 502, a trader may choose to highlight a particular field of the dialog window whenever the pointing device passes over that field. Thus, for example, when a user passes a pointer over the price field, the field will automatically be highlighted while the system awaits user input into that field. The trader may turn this function off by pushing "OFF" button 804.

In addition to dragging the window and placing it in a preferred area on the screen, a user may set the default position of market cell 100 and dialog window by using pull-down menus 506 and 508. Specifically, the position of the market cell may be selected using market cell menu 506. Menu 506 may allow a trader to drag the main trading window to any position on the screen and thereafter use that position as the default position for the main trading window, to select a quadrant of the screen, or to select any other desired portion of the screen. Dialog window menu 508 may allow the trader to select the position of the dialog window using menu options similar to those described for market cell menu 506.

Display settings screen 500 also allows a user to select the color or other characteristic (e.g., blinking text, font size, etc.) of the bid or offer. A trader may select bid menu 510 to select a color or other display characteristic for the bid. Offer menu 512 may be selected to select the color or other display characteristics for an offer. Similar options may be implemented to allow a trader to select the color and other display factors for all parameters of a trade.

Finally, "OK" button 514 and "Cancel" button 516 may be used to either confirm changes or cancel the changes selected on display settings screen 500, respectively.

Although illustrated in a particular fashion for trading particular types of items, the present invention, and thus the interfaces shown in FIGS. 1-5, may be altered to facilitate trading of any type of tradable items.

Figure 5:
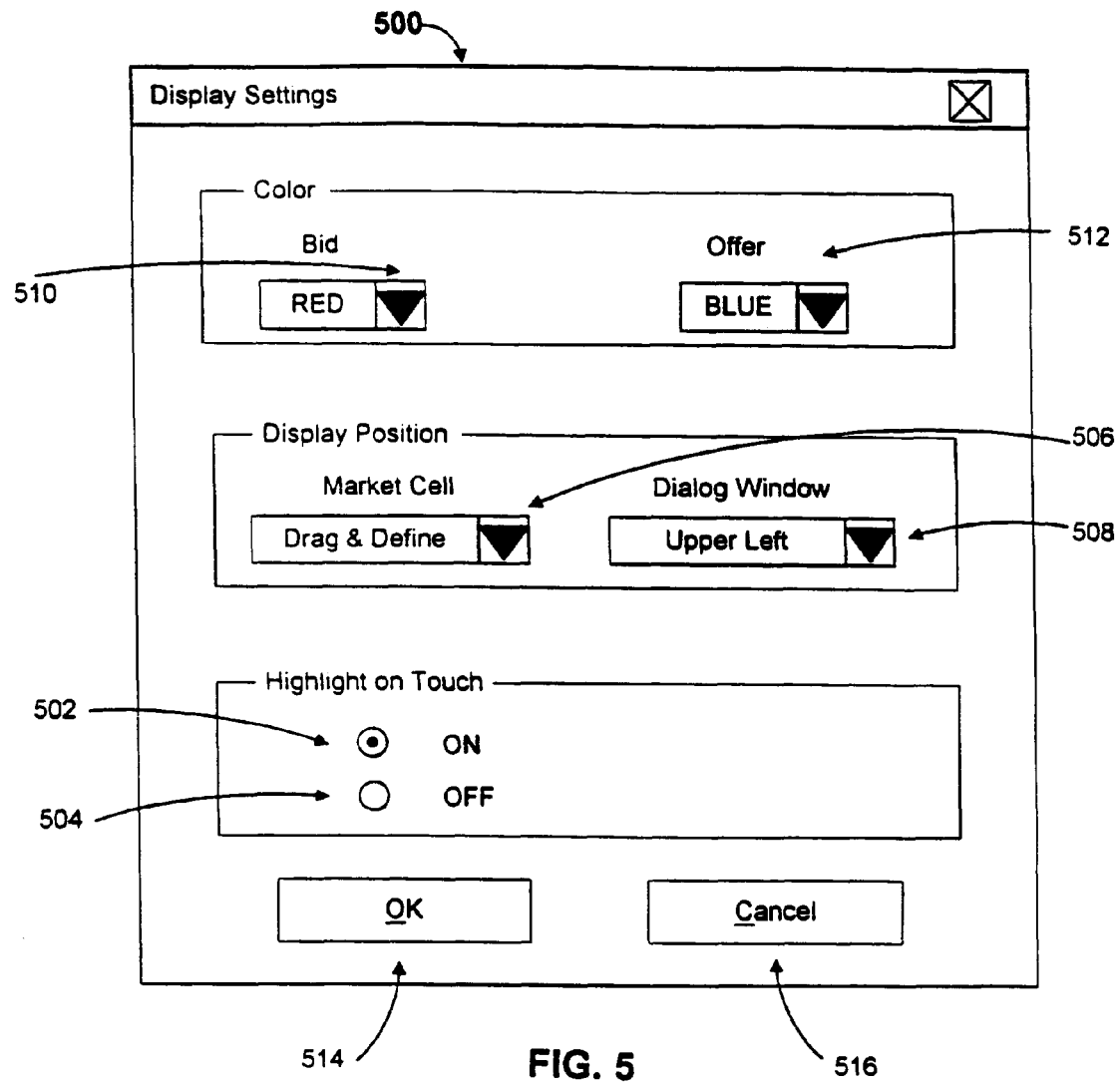
FIG. 5 is an illustration of a display settings window that may be generated in accordance with certain embodiments of the present invention.
Figure 6A:
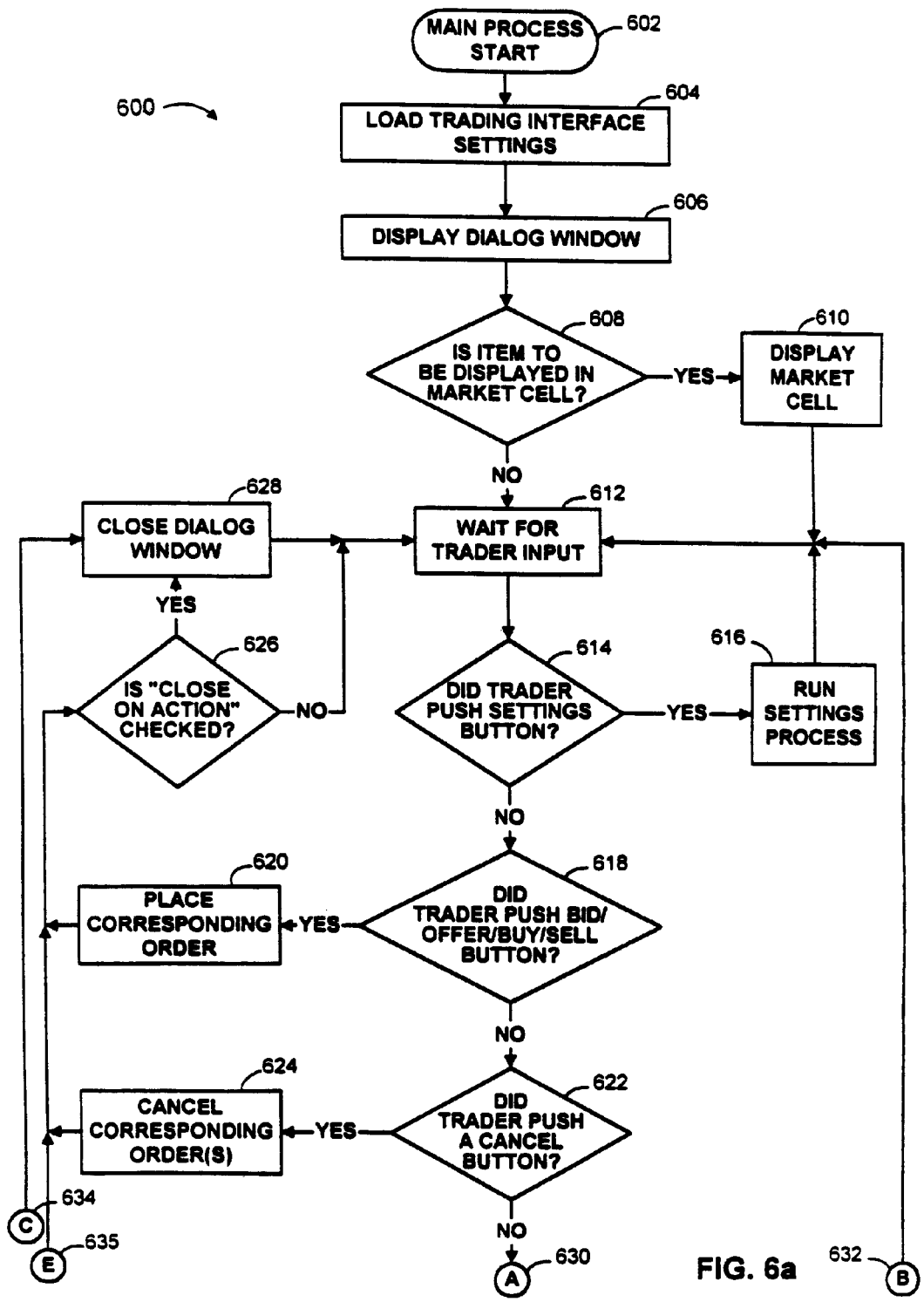
FIG. 6 is a flow diagram of a main process that may be used to perform the functions illustrated in FIGS. 1 and 2 in accordance with certain embodiments of the present invention.
Figure 6B:
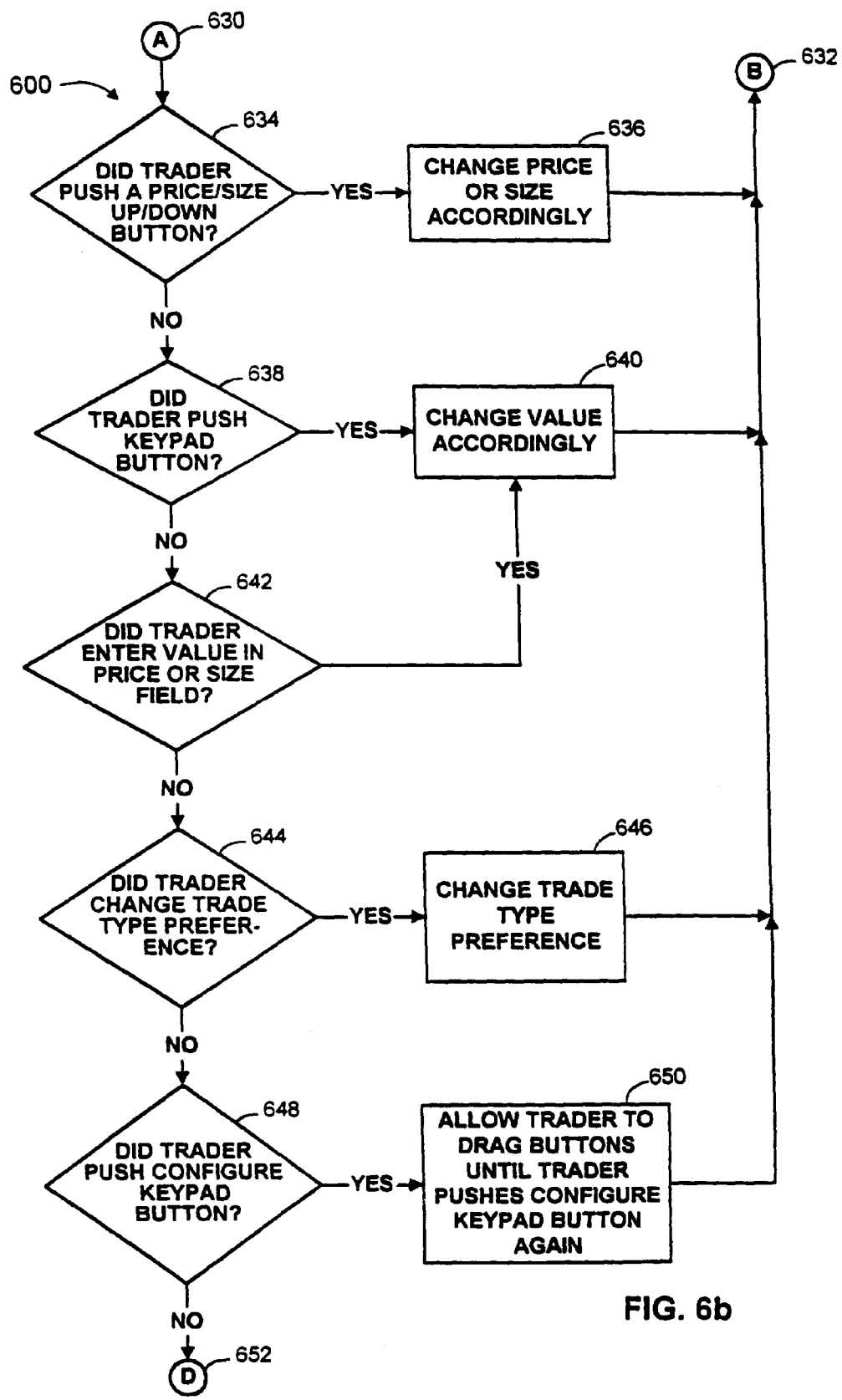
Figure 6C:
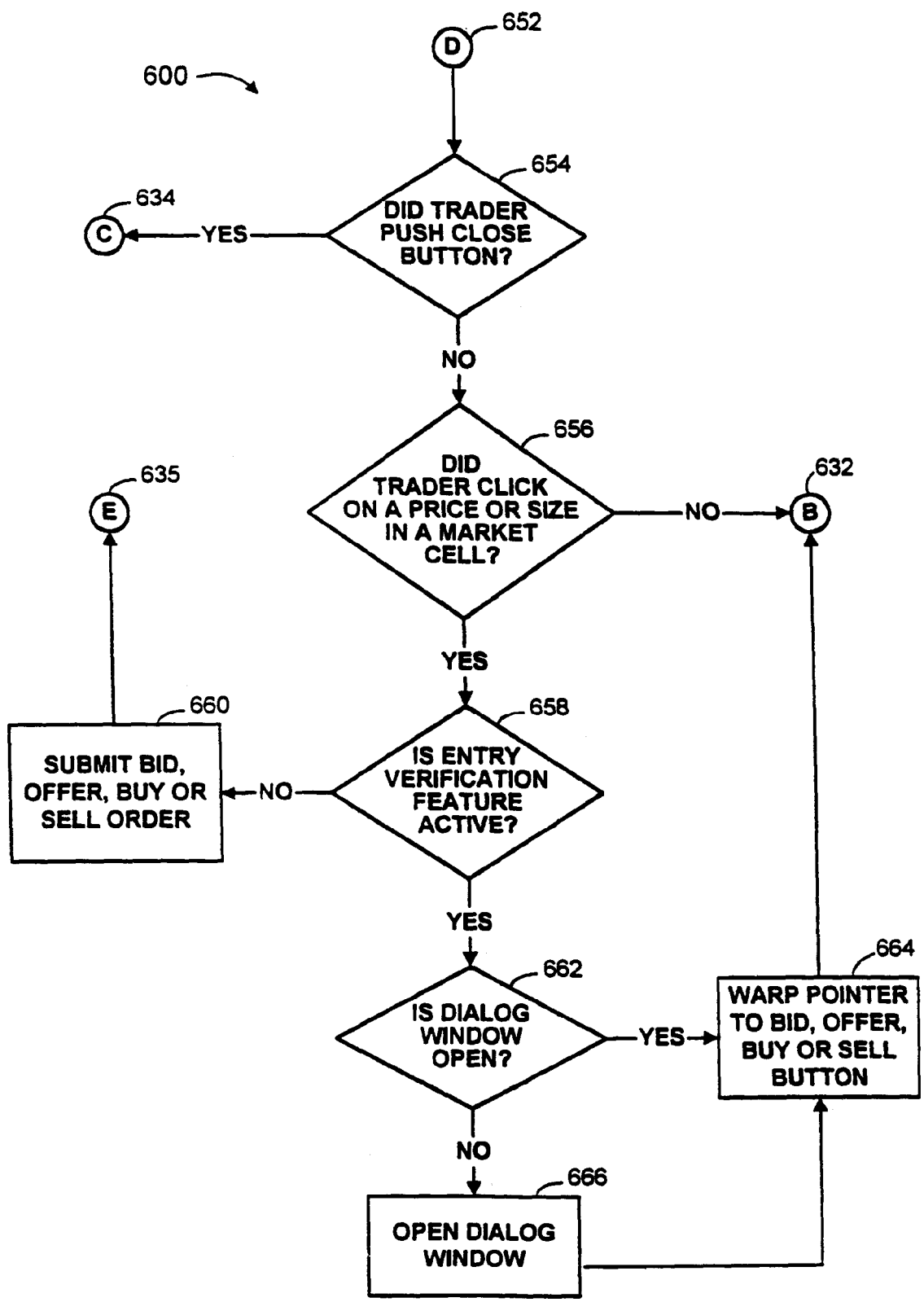

One embodiment of a main process 600 that may be used to control the presentation of the interfaces illustrated in FIGS. 1-5 is illustrated in FIGS. 6A-6C. As shown in FIG. 6A, once process 600 has begun at step 602, the process may load trading interface settings at step 604. The setting loaded at step 604 may include all of the settings configurable through screens 200, 300, 400, and 500, and any other suitable settings. Once these settings are loaded, process 600 may display a dialog window 200 at step 606. Based upon the settings loaded at step 604, process 600 then determines whether the item configured to be traded in dialog window 200 is to be displayed in a market cell. If it is, then process presents a market cell 100 at step 610. Otherwise, or after displaying the market cell, process 600 proceeds to step 612 where the process waits for trader input.

Figure 7:
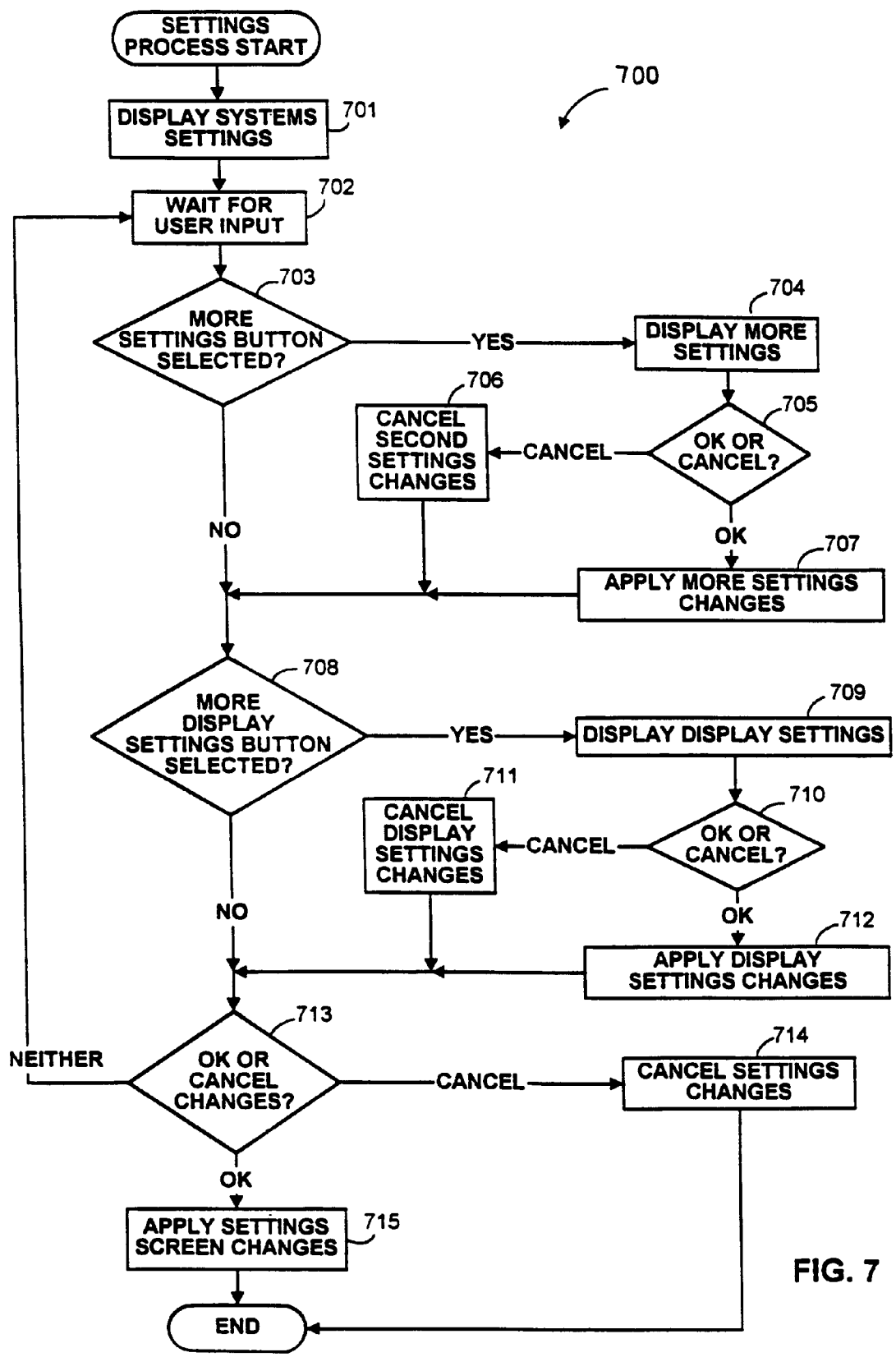
FIG. 7 is a flow diagram of a settings process that may be used to configure settings illustrated in FIGS. 1-5 in accordance with certain embodiments of the present invention.

Once trader input has been received at step 612, process 600 determines whether the trader pushed settings button 241 in dialog window 200. If the trader did push the settings button, then process runs a settings process at step 616. An example of a settings process is shown in FIG. 7. Once the settings process is completed, process 600 proceeds back to step 612 to wait for more trader input. If process 600 determines that the trader did not push the settings button at step 614, however, then process 600 proceeds to step 618 to determine if the trader pushed a bid button 212, an offer button 214, a buy button 204, or a sell button 206. If the trader did push one of these buttons, then the corresponding order is placed at step 620. Otherwise, process 600 proceeds to step 622 to determine if the trader pushed one of cancel buttons 208, 210, 216, 218, 220, or 222. If so, then process 600 cancels the corresponding orders that can be canceled at step 624. Once an order has been placed at step 620, or orders have been canceled at step 624, process 600 determines at step 626 whether "close on action" box 238 is checked in dialog window 200. If not, process 600 loops back to step 612. Otherwise process 600 closes dialog window 200 at step 628 and then proceeds to step 612.

If, at step 622, process 600 determines that the trader did not push a cancel button, however, then process 600 proceeds to step 634 as shown in FIG. 6B via link 630. At step 634, process 600 determines whether the trader pushed a price or size up or down button 226, 228, 232, or 234. If the trader did push one of these buttons, process 600 changes the price or size accordingly at step 636 and then loops back to step 612 via link 632. Otherwise, process 600 proceeds to step 638 to determine if the trader pushed a button on keypad 202. If the trader did push one of these buttons, then the process changes the value of either the price or size highlighted accordingly at step 640 and then loops back to step 612 via link 632. If the trader did not push one of the keypad buttons, process 600 next determines at step 642 whether the trader entered a value in price or size field 224 or 230. If the trader did enter a value, then process 600 changes the value in that field accordingly at step 640 and loops back to step 612 via link 632.

If process 600 determines at step 642 that the trader did not enter a value in one of the price or size fields, then process 600 determines at step 644 whether the trader changed the trade type preference 236. If the trader did change this preference, the trade type preference is changed at step 646 and process 600 loops back to step 612 via link 632. Otherwise, process 600 determines at step 648 whether the trader pushed configure keypad button 240. If the trader did push this button, then the process allows the trader to drag buttons in dialog window to new locations until the trader pushes the configure keypad button again. The new locations of the relocated buttons are then stored as settings for dialog window 200 that are loaded at step 602 and used to define the button locations each time the dialog window is opened.

If process 600 determines at step 648 that the trader did not push the configure keypad button, then process 600 proceeds to step 654 via link 652. At step 654, process determines if the trader pushed close button 242. If so, then process 600 loops back to step 628 via link 634 to close dialog window 200. Otherwise, process 600 determines at step 656 whether the trader clicked on a price 102 or 104 or size 106 or 108 in market cell 100. If not, process 600 loops back to step 612 via link 632 to wait for more trader input.

If the trader did click on a price or size in the market cell, then process 600 determines whether the entry verification feature is active at step 658. If the entry verification feature is not active, then process 600 submits a bid, offer, buy, or sell order based upon which price or size button was clicked, as described above, and then proceeds to step 626 via link 635. Otherwise, process 600 next determines whether dialog window 200 is open at step 662. If the dialog window is not open, then process 600 opens a dialog window 200 at step 666. After opening dialog window 200 at step 666, or if the dialog window was determined to be open at step 662, process 600 warps the pointer to the bid, offer, buy, or sell button based upon what was clicked in the market cell, and then process 600 loops back to step 612 via link 632.

One embodiment of a system settings process 700 that may be used to set system setting as illustrated in FIGS. 3-5 is shown in FIG. 7. As can be seen, upon pressing settings button 241 (FIG. 2), process 700 will preferably display system settings screen 300 as described in connection with FIGS. 3-5 at step 701. After displaying the system settings screen, process 700 awaits user input at step 702. Once user input is received, at step 703, process 700 determines whether the trader selected "more settings" button 302. If the trader selects "more settings" button 302, process 700 displays a second settings screen at step 704, as described in the description of FIG. 4. At step 704, the trader may then have an opportunity to adjust any setting on the second settings screen, and, at step 705, process 700 determines whether the trader pressed "OK" button 422 or "Cancel" button 424. If process 700 determines that the trader selected "Cancel" button 424, any changes made by the trader in the second settings screen will be ignored at step 706. If, however, the trader selected "OK" button 422, process 600 will proceed to step 707 and apply any changes made by the trader in the second settings screen.

If, at step 703, the trader was determined to not have chosen the "more settings" button, or after the completion of either step 706 or step 707, process 700 branches to step 708. At step 708, process 700 determines whether the trader selected the "more display settings" button from screen 300. If so, then process 700 displays display settings screen 500 at step 709. Next, at step 710, process 700 determines whether the trader selected "OK" button 514 or "Cancel" button 516 within display settings screen 500. If the trader pressed "Cancel" button 516, process 700 cancels any display settings changes at step 711. If the trader pressed "OK" button 514, process 700 applies any display settings changes at step 712.

After completing step 711 or 712, or if process 600 determines that the "more display settings" button was not selected at step 708, process 700 determines whether the trader selected "OK" button 312 or "Cancel" button 314 at step 713. If neither "OK" button 312 or "Cancel" button 314 was selected, process 700 loops back to step 702 where the process will once again await user input. If the trader selected "Cancel" button 314, however, process 700 will proceed to step 614 and cancel all changes made at the system settings screen. Hitting "Cancel" button 314, however, preferably will not cancel changes that the trader may have made in the second setting screen displayed at step 704 or in the display settings screen display at step 709. If the trader, selected "OK" button 312, process 700 will proceed to step 715. Step 715 accepts and applies any changes made in the system settings screen. After completing step 714 or 714, process 700 terminates.

Figure 8:
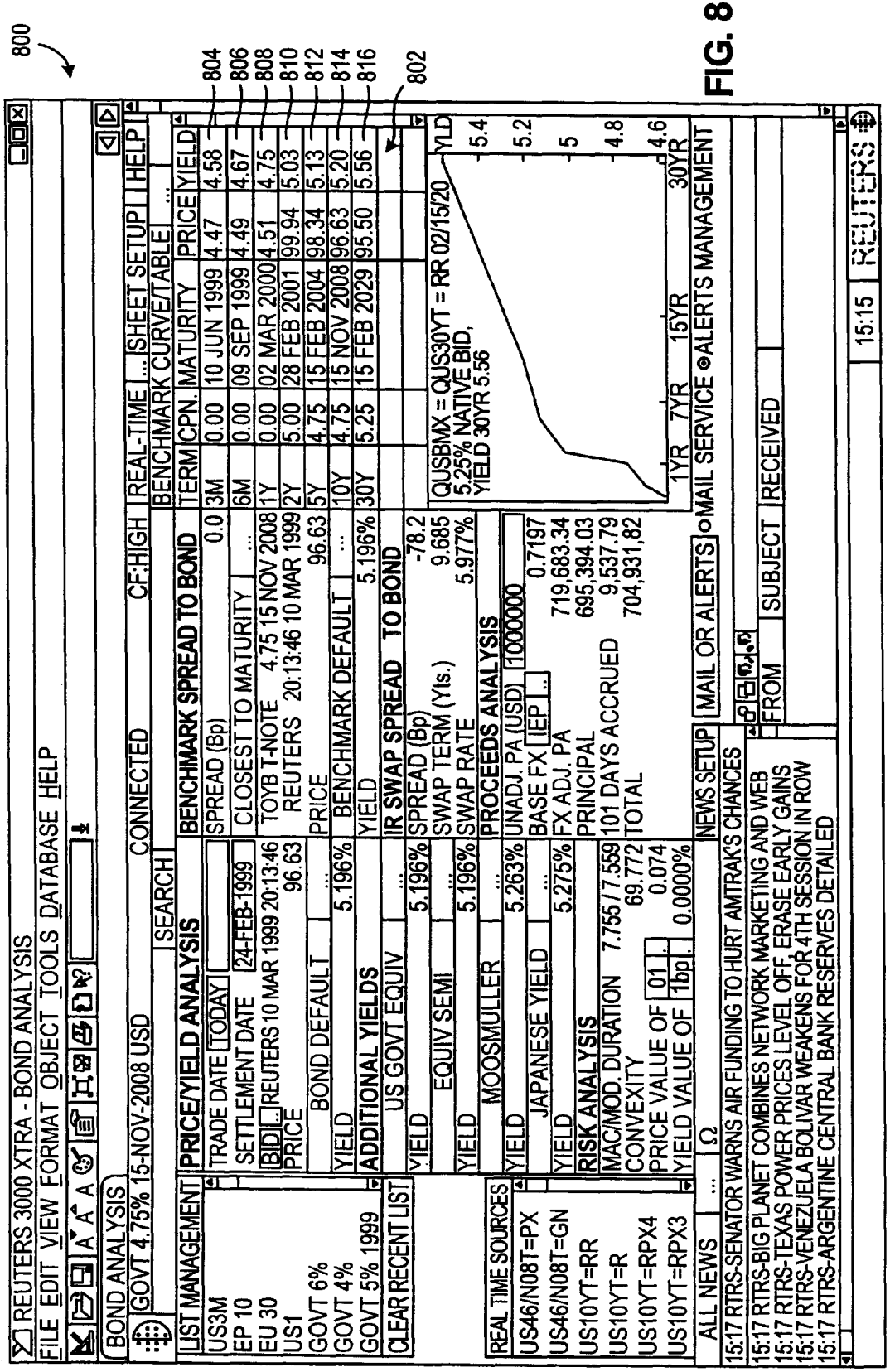
FIG. 8 is an illustration of an entry window that may be used to select items to be traded using the dialog window of FIG. 2 in accordance with certain embodiments of the present invention.

In accordance with the present invention, a data window may be used in addition to or instead of market cell 100 to initiate or submit order commands via dialog window 200. The Data window may be any window for displaying data on tradable items. For example, a data window may be a market data display, a web page including financial data or auction information, a spread sheet, etc. As another example, as shown in FIG. 8, a data window 800 may be used for this purpose. Data window 800 is a Bond Analysis window that is part of the Reuters 3000 Xtra product that is available from Reuters Limited. Within data window 800 is a field 802 that contains information on various bonds 804-816. By clicking on any of bonds 804-816, a trader can cause a bid order command to be submitted via dialog window 200.

Figure 9:
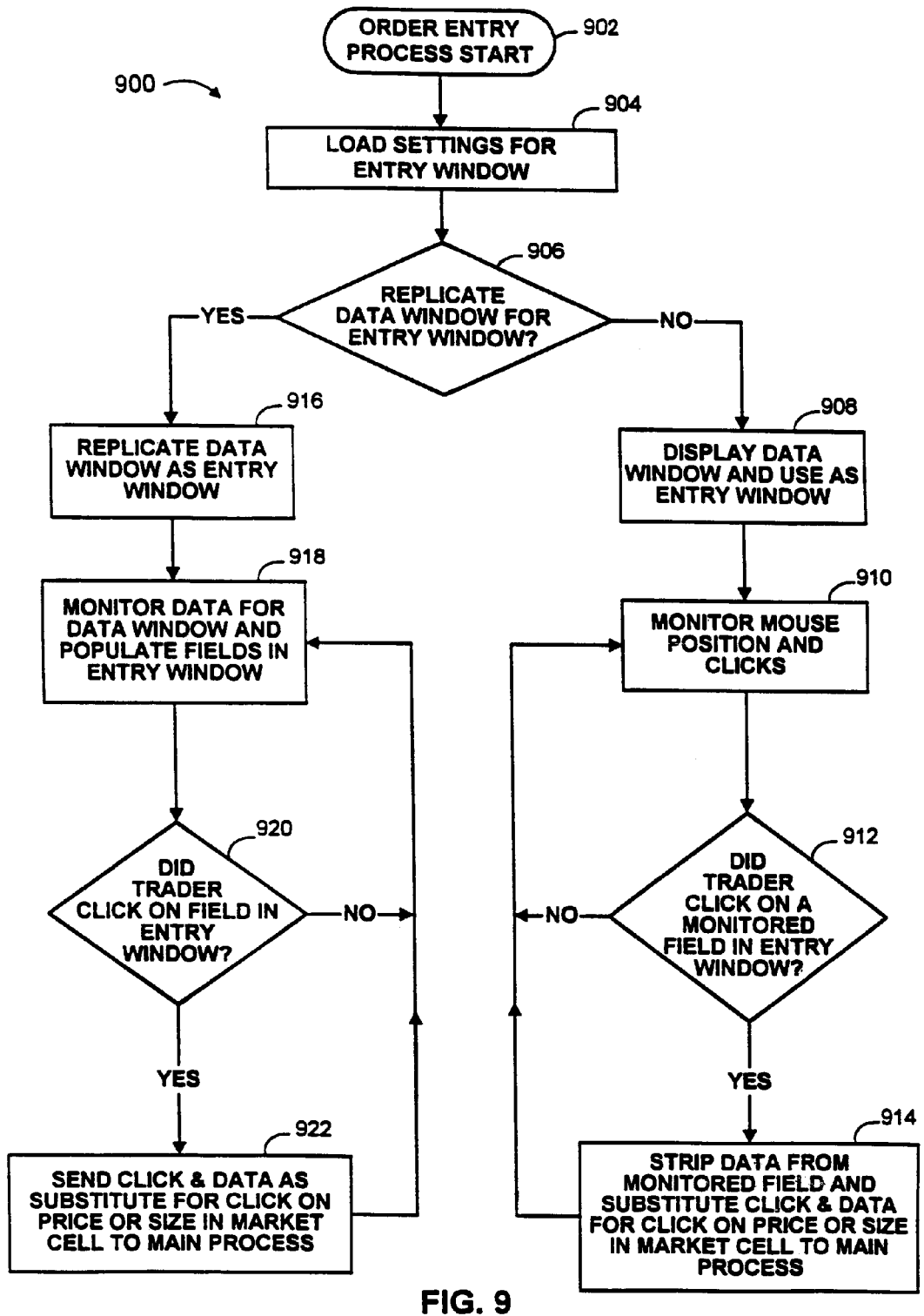
FIG. 9 is a flow diagram of an entry window process that may be used to interface the entry window of FIG. 8 with the dialog window of FIG. 2 in accordance with certain embodiments of the present invention.

An example of an order entry process 900 for enabling the submitting of order commands via dialog window 200 and a data window is shown in FIG. 9. Through this process, an entry window that is either a replica of the data entry window or the data window itself is used to detect when a trader selects an item within the data window. As illustrated, after process 900 has begun at step 902, this process loads settings for an entry window at step 904. Next, based upon the settings loaded, process 900 determines at step 906 whether to replicate a data window for the entry window or to use the data window itself as the entry window. If the data window is to be replicated for the entry window, then process 900 proceeds to step 916 at which the data window is replicated as the entry window. Although replication of the data window is illustrated as part of process 900, replication may be performed using an automated process or may be performed in conjunction with manual copying of the data window.

Next, at step 918, process 900 monitors data that is being sent to the data window and populates fields within the entry window with that data. Through steps 916 and 918, the entry window preferably appears identical to the data window. Alternatively, the entry window may be different from the data window and use the data window data. Following step 918, process 900 determines at step 920 whether a trader clicked on a field in entry window. As part of the replication of the data window, the entry window is preferably constructed to facilitate detection of clicks on various fields within the entry window. If the trader did click on a field in the entry window, the click and corresponding data in the entry window are sent to dialog window 200 as a substitute for a click on a price or size in market cell 100 at step 922. The click and corresponding data are preferably detected by main process 600 at step 656 and appear to process 600 like a click on a price or size in a market cell. Because the trader may click on a variety of items in the entry window, the data accompanying the click may be used by process 600 to select another tradable item prior to submitting a bid, offer, buy, or sell command. If no click is detected at step 920, or after the click and data have sent to main process 600 at step 922, process 900 loops back to step 918.

If, at step 906, process 900 determines that the data window is not to be replicated, then process 900 displays the data window and uses the data window as the entry window. Because the data window may not be an interactive window, process 900 may monitor the mouse position and clicks at step 910 to determine whether the trader is trying to click on an element in the data window as the entry window. Next, at step 912, process 900 determines whether the trader clicked on a monitored field in the entry window. If the trader did click on a monitored field, process 900, at step 914, strips the data from the monitored field, substitutes the click and stripped data for a click on a price or size in the market cell, and sends that click and data to main process 600. The data may be stripped by monitoring the data being fed to the data window, by scanning video memory corresponding to the field of the data window clicked on, or using any other suitable process. The click and stripped data are preferably detected by main process 600 at step 656 and appear to process 600 like a click on a price or size in a market cell. Because the trader may click on a variety of items in the entry window, the data accompanying the click may be used by process 600 to select another tradable item prior to submitting a bid, offer, buy, or sell command. If no click is detected at step 912, or after the click and data have sent to main process 600 at step 914, process 900 loops back to step 910.

Figure 10:
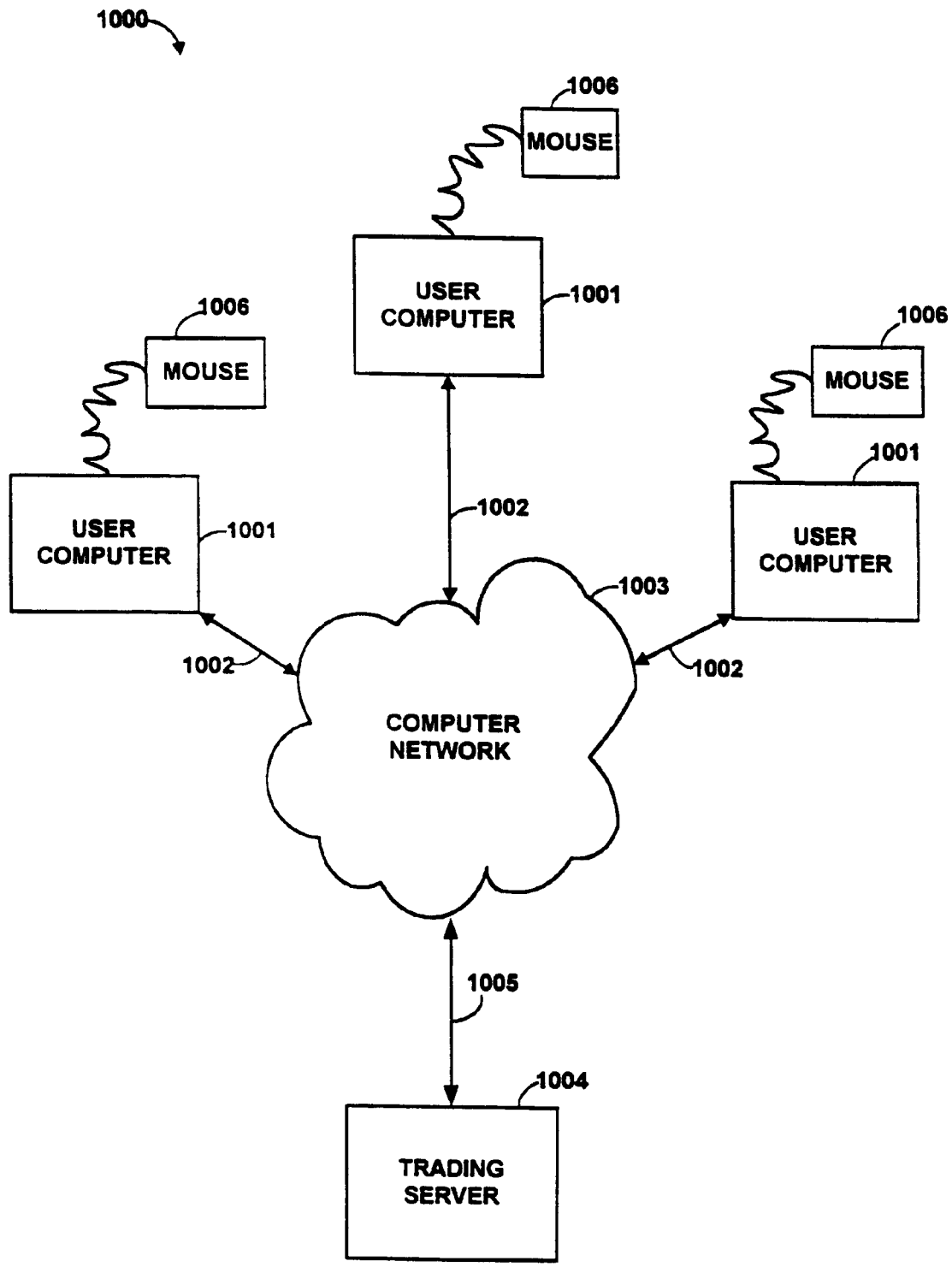
FIG. 10 is a block diagram of a system that may be used to implement the processes and functions illustrated in FIGS. 1-9 in accordance with certain embodiments of the present invention.

One example of a system 1000 for implementing the present invention is shown in FIG. 10. As illustrated, system 1000 may include one or more computers 1001, including a mouse 1006, that are connected by one or more communication links 1002 to a computer network 1003 that is linked via a communication link 1005 to a trading server 1004.

In system 1000, trading server 1004 may be any suitable server, processor, computer, or data processing device, or combination of the same. Computer network 1003 may be any suitable computer network including the Internet, an Intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 1002 and 1005 may be any suitable communication links suitable for communicating data between computers 1001 and server 1004, such as network links, dial-up links, wireless links, hard-wired links, etc. User computers 1001 may be any suitable computers, processors, computer terminals, displays, portable computers, personal digital assistants, or any other suitable data processing devices, or combinations of the same.

It should be obvious to one of ordinary skill in the art that the present invention may be practiced in embodiments other than those illustrated herein without departing from the spirit and scope of the present invention, and that the invention is only limited by the claims which follow.

What is claimed:

1. An apparatus, comprising:
a processor; and
a memory, the memory storing computer readable code that, when executed by the processor, causes the processor to:
  display a first interface, the first interface comprising a plurality of selectable trading commands for trading at least one item;
  in response to a selection of at least one of the plurality of selectable trading commands,
  display a second interface comprising:
    a price field, in which a price displayed in the price field is adjustable;
    a size field, in which a size displayed in the size field is adjustable, and in which the price and the size are associated with trading the item;
    one or more numeric buttons, in which the size is adjustable to a desired size, in response to a selection of at least one numeric button;
    at least one first button for confirming the at least one of the plurality of selectable trading commands; and
    at least one second button for submitting another of the plurality of selectable trading commands;
  and
  in response to a selection of the second button, submit a trade command associated with the second button to an electronic trade system for execution.

2. A method, comprising:
displaying, by a processor of a computer, a first interface, the first interface comprising a plurality of selectable trading commands for trading at least one item;
in response to a selection of at least one of the plurality of selectable trading commands, displaying, by the processor, a second interface comprising:
  a price field, in which a price displayed in the price field is adjustable;
  a size field, in which a size displayed in the size field is adjustable, and in which the price and the size are associated with trading the item;
  one or more numeric buttons, in which the size is adjustable to a desired size, in response to a selection of at least one numeric button;
  at least one first button for confirming the at least one of the plurality of selectable trading commands; and
  at least one second button for submitting another of the plurality of selectable trading commands; and
in response to a selection of the second button, submitting, by the processor, a trade command associated with the second button to an electronic trade system for execution.

3. An apparatus, comprising: a processor; and
a memory, the memory storing computer readable code that, when executed by the processor, causes the processor to:
  display at least one of a bid for at least one item and an offer for the at least one item at a first interface, wherein a plurality of trading commands for trading the at least one item are available for selection in conjunction with the first interface, the plurality of trading commands comprising a first trading command and a second trading command;

receive input indicative of a selection of the first trading command of the plurality of trading commands;

in response to the input, display a second interface, the second interface comprising:
- a price field, in which a price displayed in the price field is adjustable;
- a size field, in which a size displayed in the size field is adjustable, and in which the price and the size are associated with trading the item:
- one or more numeric buttons, in which the size is adjustable to a desired size, in response to a selection of at least one numeric button;
- at least one first button for confirming the selection of the first trading command; and
- at least one second button for submitting the second trading command of the plurality of trading commands;

and in response to a selection of the second button at the second interface, submit the second trade command to an electronic trade system for execution.

4. The apparatus of claim 3, wherein the second interface further comprises:
at least one cancel button for canceling the selection of the first trading command.

5. The apparatus of claim 3, wherein the computer readable code, when executed by the processor, further causes the processor to:
in response to the input, position a pointing device pointer over the at least one first button.

6. The apparatus of claim 3, wherein the computer readable code, when executed by the processor, further causes the processor to:
in response to the input, position a pointing device pointer over the at least one second button.

7. The apparatus of claim 4, wherein the computer readable code, when executed by the processor, further causes the processor to:
in response to the input, position a pointing device pointer over the at least one cancel button.

8. The apparatus of claim 3, wherein the first interface comprises a command line interface; and wherein receiving the input indicative of the selection of the first trading command comprises:
receiving a keyboard entry of the first trading command.

9. The apparatus of claim 3, wherein receiving the input indicative of the selection of the first trading command comprises:
receiving a pointing device entry of the first trading command.

10. The apparatus of claim 3, wherein receiving the input indicative of the selection of the first trading command comprises:
receiving, from a pointing device, a selection at the first interface of at least one component of the at least one of the bid for the at least one item and the offer for the at least one item.

11. The apparatus of claim 3, wherein the computer readable code, when executed by the processor, further causes the processor to:
receive second input indicative of a selection of the second trading command of the plurality of trading commands; and in response to the second input, display another instance of the second interface, the another instance of the second interface comprising:
- a button for confirming the selection of the second trading command;
- a cancel button for canceling the selection of the second trading command; and
- another button for submitting the first trading command of the plurality of trading commands.

12. The apparatus of claim 11, wherein the computer readable code, when executed by the processor, further causes the processor to:
in response to a selection of the button at the another instance of the second interface, submit the second trade command to the electronic trade system for execution.

13. The apparatus of claim 11, wherein the computer readable code, when executed by the processor, further causes the processor to:
in response to a selection of the cancel button at the another instance of the second interface,
cancel the second trade command; and
not submit the second trade command to the electronic trade system for execution.

14. The apparatus of claim 11, wherein the computer readable code, when executed by the processor, further causes the processor to:
in response to a selection of the another button at the another instance of the second interface, submit the first trade command to the electronic trade system for execution.

15. The apparatus of claim 4, wherein the at least one first button and the at least one cancel button are associated with the first trading command, and the at least one second button is associated with the second trading command.

16. The apparatus of claim 3, wherein the second interface further comprises at least one of a price field and a size field.

17. The apparatus of claim 3, wherein displaying at least one of the bid for the at least one item and the offer for the at least one item at the first interface comprises:
displaying one or more components of the bid for the at least one item at the first interface, wherein at least one component of the one or more components is selectable at the first interface to indicate a selection of at least one of the plurality of trading commands.

18. The apparatus of claim 17, wherein the computer readable code, when executed by the processor, further causes the processor to:
in response to a selection of a bid price at the first interface, post the bid price in the price field of the second interface, wherein the at least one component of the one or more components of the bid for the at least one item comprises the bid price.

19. The apparatus of claim 17, wherein the computer readable code, when executed by the processor, further causes the processor to:
in response to a selection of a bid size at the first interface, post the bid size in the size field of the second interface, wherein the at least one component of the one or more components of the bid for the at least one item comprises the bid size.

20. The apparatus of claim 3, wherein displaying at least one of the bid for the at least one item and the offer for the at least one item at the first interface comprises:
displaying one or more components of the offer for the at least one item at the first interface, wherein at least one component of the one or more components is selectable at the first interface to indicate a selection of at least one of the plurality of trading commands.

21. The apparatus of claim 20, wherein the computer readable code, when executed by the processor, further causes the processor to:
in response to a selection of an offer price at the first interface, post the offer price in the price field of the second interface, wherein the price field is alterable and wherein the at least one component of the one or more components of the offer for the at least one item comprises the offer price.

22. The apparatus of claim 20, wherein the computer readable code, when executed by the processor, further causes the processor to:
in response to a selection of an offer size at the first interface, post the offer size in the size field of the second interface, wherein the size field is alterable and wherein the at least one component of the one or more components of the offer for the at least one item comprises the offer size.

23. The apparatus of claim 3, wherein the computer readable code, when executed by the processor, further causes the processor to:
in response to the input, display at least one offer variable associated with the at least one item.

24. The apparatus of claim 23, wherein displaying the at least one offer variable comprises:
initially displaying the at least one offer variable in a first color;
and wherein the computer readable code, when executed by the processor, further causes the processor to:
in response to a pointing device pointer being placed over the at least one offer variable, displaying the at least one offer variable in a second color.

25. The apparatus of claim 23, wherein displaying the at least one offer variable comprises:
displaying the at least one offer variable in at least one of: a market cell, a spread sheet, a data window, an entry window, and a web page.

26. The apparatus of claim 3, wherein the computer readable code, when executed by the processor, further causes the processor to:
in response to the input, display at least one bid variable associated with the at least one item.

27. The apparatus of claim 26, wherein displaying the at least one bid variable comprises:
initially displaying the at least one bid variable in a first color;
and wherein the computer readable code, when executed by the processor, further causes the processor to:
in response to a pointing device pointer being placed over the at least one bid variable, displaying the at least one bid variable in a second color.

28. The apparatus of claim 26, wherein displaying the at least one bid variable comprises:
displaying the at least one bid variable in at least one of: a market cell, a spread sheet, a data window, an entry window, and a web page.

29. A method, comprising:
displaying, by a processor of a computer, at least one of a bid for at least one item and an offer for the at least one item at a first interface, wherein a plurality of trading commands for trading the at least one item are available for selection in conjunction with the first interface, the plurality of trading commands comprising a first trading command and a second trading command;
receiving, by the processor, input indicative of a selection of the first trading command of the plurality of trading commands;
in response to the input, displaying, by the processor, a second interface, the second interface comprising:
a price field, in which a price displayed in the price field is adjustable;
a size field, in which a size displayed in the size field is adjustable, and in which the price and the size are associated with trading the item;
one or more numeric buttons, in which the size is adjustable to a desired size, in response to a selection of at least one numeric button;
at least one first button for confirming the selection of the first trading command; and
at least one second button for submitting the second trading command of the plurality of trading commands;
and
in response to a selection of the second button at the second interface, submitting, by the processor, the second trade command to an electronic trade system for execution.

30. The method of claim 29, wherein the second interface further comprises:
at least one cancel button for canceling the selection of the first trading command.

31. The method of claim 29, further comprising:
in response to the input, positioning, by the processor, a pointing device pointer over the at least one first button.

32. The method of claim 29, further comprising:
in response to the input, positioning, by the processor, a pointing device pointer over the at least one second button.

33. The method of claim 30, further comprising:
in response to the input, positioning, by the processor, a pointing device pointer over the at least one cancel button.

34. The method of claim 29, wherein the first interface comprises a command line interface; and wherein receiving the input indicative of the selection of the first trading command comprises:
receiving, by the processor, a keyboard entry of the first trading command.

35. The method of claim 29, wherein receiving the input indicative of the selection of the first trading command comprises:
receiving, by the processor, a pointing device entry of the first trading command.

36. The method of claim 29, wherein receiving the input indicative of the selection of the first trading command comprises:
receiving, by the processor, from a pointing device, a selection at the first interface of at least one component of the at least one of the bid for the at least one item and the offer for the at least one item.

37. The method of claim 29, further comprising:
receiving, by the processor, second input indicative of a selection of the second trading command of the plurality of trading commands; and
in response to the second input, displaying, by the processor, another instance of the second interface, the another instance of the second third interface comprising:
a button for confirming the selection of the second trading command;
a cancel button for canceling the selection of the second trading command; and another button for submitting the first trading command of the plurality of trading commands.

38. The method of claim 37, further comprising: in response to a selection of the button at the another instance of the second interface, submitting, by the processor, the second trade command to the electronic trade system for execution.

39. The method of claim 37, further comprising:
in response to a selection of the cancel button at the another instance of the second interface, canceling, by the processor, the second trade command; and
not submitting, by the processor, the second trade command to the electronic trade system for execution.

40. The method of claim 37, further comprising: in response to a selection of the another button at the another instance of the second interface, submitting, by the processor, the first trade command to the electronic trade system for execution.

41. The method of claim 30, wherein the at least one first button and the at least one cancel button are associated with the first trading command, and the at least one second button is associated with the second trading command.

42. The method of claim 29, wherein the second interface further comprises at least one of a price field and a size field.

43. The method of claim 29, wherein displaying at least one of the bid for the at least one item and the offer for the at least one item at the first interface comprises:
displaying, by the processor, one or more components of the bid for the at least one item at the first interface, wherein at least one component of the one or more components is selectable at the first interface to indicate a selection of at least one of the plurality of trading commands.

44. The method of claim 43, further comprising: in response to a selection of a bid price at the first interface, posting, by the processor, the bid price in the price field of the second interface, wherein the at least one component of the one or more components of the bid for the at least one item comprises the bid price.

45. The method of claim 43, further comprising: in response to a selection of a bid size at the first interface, posting, by the processor, the bid size in the size field of the second interface, wherein the at least one component of the one or more components of the bid for the at least one item comprises the bid size.

46. The method of claim 29, wherein displaying at least one of the bid for the at least one item and the offer for the at least one item at the first interface comprises:
displaying, by the processor, one or more components of the offer for the at least one item at the first interface, wherein at least one component of the one or more components is selectable at the first interface to indicate a selection of at least one of the plurality of trading commands.

47. The method of claim 46, further comprising: in response to a selection of an offer price at the first interface, posting, by the processor, the offer price in the price field of the second interface, wherein the at least one component of the one or more components of the offer for the at least one item comprises the offer price.

48. The method of claim 46, further comprising: in response to a selection of an offer size at the first interface, posting, by the processor, the offer size in the size field of the second interface, wherein the at least one component of the one or more components of the offer for the at least one item comprises the offer size.

49. The method of claim 29, further comprising:
in response to the input, displaying, by the processor, at least one offer variable associated with the at least one item.

50. The method of claim 49, wherein displaying the at least one offer variable comprises:
initially displaying, by the processor, the at least one offer variable in a first color; and
wherein the method further comprises:
in response to a pointing device pointer being placed over the at least one offer variable, displaying, by the processor, the at least one offer variable in a second color.

51. The method of claim 50, wherein displaying the at least one offer variable comprises:
displaying, by the processor, the at least one offer variable in at least one of: a market cell, a spread sheet, a data window, an entry window, and a web page.

52. The method of claim 29, further comprising:
in response to the input, displaying, by the processor, at least one bid variable associated with the at least one item.

53. The method of claim 52, wherein displaying the at least one bid variable comprises:
initially displaying, by the processor, the at least one bid variable in a first color;
and wherein the method further comprises:
in response to a pointing device pointer being placed over the at least one bid variable, displaying, by the processor, the at least one bid variable in a second color.

54. The method of claim 52, wherein displaying the at least one bid variable comprises:
displaying, by the processor, the at least one bid variable in at least one of: a market cell, a spread sheet, a data window, an entry window, and a web page.

55. The apparatus of claim 3, in which the one or more numeric buttons comprise: a button for a number 1; a button for a number 5; a button for a number 10; and a button for a number 100.

56. The apparatus of claim 29, in which the one or more numeric buttons comprise:
a button for a number 1;
a button for a number 5;
a button for a number 10; and
a button for a number 100.

\* \* \* \* \*